(12) United States Patent
Kubota et al.

(10) Patent No.: US 7,921,334 B2
(45) Date of Patent: Apr. 5, 2011

(54) PROGRAM AND METHOD FOR ERROR DETERMINATION, AND ELECTRONIC APPARATUS

(75) Inventors: Shinsuke Kubota, Sapporo (JP); Takayuki Ohtake, Sapporo (JP)

(73) Assignee: Seiko Epson Corporation (JP)

( * ) Notice: Subject to any disclaimer, the term of this patent is extended or adjusted under 35 U.S.C. 154(b) by 352 days.

(21) Appl. No.: 12/124,214

(22) Filed: May 21, 2008

(65) Prior Publication Data

US 2008/0294945 A1    Nov. 27, 2008

(30) Foreign Application Priority Data

May 22, 2007    (JP) ................................ 2007-135257

(51) Int. Cl.
*G06F 11/00*    (2006.01)
(52) U.S. Cl. .......................................................... 714/42
(58) Field of Classification Search .................... None
See application file for complete search history.

(56) References Cited

U.S. PATENT DOCUMENTS

| 7,162,549 B2 * | 1/2007 | Mambakkam et al. ......... 710/16 |
| 2008/0086631 A1 * | 4/2008 | Chow et al. ........................ 713/2 |

FOREIGN PATENT DOCUMENTS

| JP | 2002-324223 | 11/2002 |
| JP | 2002-342256 | 11/2002 |
| JP | 2003-281477 | 10/2003 |
| JP | 2005-275739 | 10/2005 |
| JP | 2006-139556 | 6/2006 |
| JP | 2007-122241 | 5/2007 |

OTHER PUBLICATIONS

SanDisk Secure Digital Card Product Manual, Dec. 2003, Version 1.9, http://alumni.cs.ucr.edu/~amitra/sdcard/ProdManual SDCardv1.9.pdf.*

* cited by examiner

*Primary Examiner* — Michael C Maskulinski
(74) *Attorney, Agent, or Firm* — Harness, Dickey & Pierce, P.L.L.C.

(57) ABSTRACT

There is provided an error determination program executed by an information processor included in an electronic apparatus that includes a device installation section capable of installing any one of a plurality of devices having different formats, a host controller acting as an intermediary between the information processor and the device installed in the device installation section, and a storage circuit storing an error determination information table that includes a plurality of pieces of error determination information for determining a presence or absence of any error in a plurality of responses to a plurality of commands from the devices installable in the device installation section, by associating the pieces of error determination information with a combination of the formats of the installable devices and the commands executable by the devices. The program includes instructing the host controller to issue a desired command in the commands executable by the device installed in the device installation section to the installed device; acquiring the error determination information associated with the combination of the format of the installed device and the desired command from the error determination information table; acquiring response content information regarding a content of a response to the desired command from the installed device from the host controller; and determining the presence or absence of any error in the response based on the error determination information and the response content information.

15 Claims, 19 Drawing Sheets

RESPONSE CHECK BIT TABLE
CheckBit[k] (0≦k≦49)

| | | CHECK PATTERNS (hex) |
|---|---|---|
| LOOKUP VALUES | [0] | 0000 0000 |
| | [1] | 00D8 0000 |
| | [2] | C0FC 0000 |
| | [3] | 00FE 0000 |
| | [4] | CCFE 0000 |
| | [5] | 20D8 0000 |
| | [6] | C0F8 0000 |
| | [7] | C4DA 0000 |
| | [8] | C4D8 0000 |
| | [9] | 00D9 0000 |
| | [10] | 80D8 0000 |
| | [11] | 98D8 0000 |
| | [12] | 10D8 0000 |
| | [13] | 01D8 0000 |
| | [14] | C1FC 0000 |
| | [15] | 01FE 0000 |
| | [16] | CDFE 0000 |
| | [17] | 21D8 0000 |
| | [18] | C1F8 0000 |
| | [19] | C5DA 0000 |
| | [20] | C5D8 0000 |
| | [21] | 01D9 0000 |
| | [22] | 81D8 0000 |
| | [23] | 99D8 0000 |
| | [24] | 11D8 0000 |
| | [25] | 01DE 0000 |
| | [26] | CDDE 0000 |
| | [27] | 0098 0000 |
| | [28] | 00C8 0000 |
| | [29] | 00D8 2080 |
| | [30] | 00D8 2000 |
| | [31] | 80FC 2000 |
| | [32] | 0098 2000 |
| | [33] | 20D8 2000 |
| | [34] | E0F8 2000 |
| | [35] | 84DA 2000 |
| | [36] | E4D8 2000 |
| | [37] | 00D9 2000 |
| | [38] | 80D8 2000 |
| | [39] | 10D8 8000 |

| | | CHECK PATTERNS (hex) |
|---|---|---|
| LOOKUP VALUES | [40] | 01D8 2000 |
| | [41] | 0DFF 0000 |
| | [42] | C4FE 0000 |
| | [43] | 2DFF 0000 |
| | [44] | CDFF 0000 |
| | [45] | 8DFF 0000 |
| | [46] | 9DFF 0000 |
| | [47] | 1DFF 0000 |
| | [48] | 81FE 0000 |
| | [49] | EDFF 0000 |

FIG. 5

LOOKUP TABLE
Lookup[m][n] (0≦m≦6, 0≦n≦63)

| COMMAND INDEXES | MMC 1.x [0] | MMC 2.x [1] | MMC 3.x [2] | MMC 4.x [3] | SD 1.01 [4] | SD 1.10 2.00 [5] | SD ACMD [6] |
|---|---|---|---|---|---|---|---|
| 00 | 1 | 13 | 13 | 27 | 0 | 0 | 0 |
| 01 | 1 | 13 | 13 | 28 | 0 | 0 | 0 |
| 02 | 1 | 13 | 13 | 28 | 0 | 0 | 0 |
| 03 | 1 | 13 | 13 | 1 | 0 | 0 | 0 |
| 04 | 1 | 13 | 13 | 1 | 0 | 0 | 0 |
| 05 | 0 | 0 | 0 | 0 | 0 | 0 | 0 |
| 06 | 0 | 0 | 0 | 29 | 0 | 48 | 45 |
| 07 | 1 | 13 | 13 | 30 | 41 | 41 | 0 |
| 08 | 0 | 0 | 0 | 30 | 0 | 0 | 0 |
| 09 | 1 | 13 | 13 | 30 | 0 | 0 | 0 |
| 10 | 1 | 13 | 13 | 30 | 0 | 0 | 0 |
| 11 | 2 | 14 | 14 | 31 | 0 | 0 | 0 |
| 12 | 3 | 15 | 25 | 1 | 42 | 42 | 0 |
| 13 | 4 | 16 | 26 | 1 | 44 | 44 | 41 |
| 14 | 0 | 0 | 0 | 30 | 0 | 0 | 0 |
| 15 | 1 | 13 | 13 | 32 | 0 | 0 | 0 |
| 16 | 5 | 17 | 17 | 33 | 43 | 43 | 0 |
| 17 | 6 | 18 | 18 | 34 | 44 | 44 | 0 |
| 18 | 6 | 18 | 18 | 34 | 44 | 44 | 0 |
| 19 | 0 | 0 | 0 | 30 | 0 | 0 | 0 |
| 20 | 7 | 19 | 19 | 35 | 0 | 0 | 0 |
| 21 | 0 | 0 | 0 | 0 | 0 | 0 | 0 |
| 22 | 0 | 0 | 0 | 0 | 0 | 0 | 41 |
| 23 | 1 | 13 | 13 | 30 | 0 | 0 | 41 |
| 24 | 8 | 20 | 20 | 36 | 44 | 49 | 0 |
| 25 | 8 | 20 | 20 | 36 | 44 | 49 | 0 |
| 26 | 9 | 21 | 21 | 37 | 41 | 41 | 0 |
| 27 | 1 | 13 | 13 | 37 | 41 | 41 | 0 |
| 28 | 10 | 22 | 22 | 38 | 45 | 45 | 0 |
| 29 | 10 | 22 | 22 | 38 | 45 | 45 | 0 |
| 30 | 10 | 22 | 22 | 38 | 45 | 45 | 0 |
| 31 | 0 | 0 | 0 | 0 | 0 | 0 | 0 |
| 32 | 11 | 23 | 0 | 0 | 46 | 46 | 0 |
| 33 | 11 | 23 | 0 | 0 | 46 | 46 | 0 |
| 34 | 11 | 23 | 0 | 0 | 0 | 0 | 0 |
| 35 | 11 | 23 | 23 | 11 | 0 | 0 | 0 |
| 36 | 11 | 23 | 23 | 11 | 0 | 0 | 0 |
| 37 | 11 | 23 | 0 | 0 | 0 | 0 | 0 |
| 38 | 12 | 24 | 24 | 39 | 47 | 47 | 0 |
| 39 | 1 | 13 | 13 | 30 | 0 | 0 | 0 |

FIG. 6

LOOKUP TABLE
Lookup[m][n] (0≦m≦6,0≦n≦63)

| | | MMC 1.x | MMC 2.x | MMC 3.x | MMC 4.x | SD 1.01 | SD 1.10 2.00 | SD ACMD |
|---|---|---|---|---|---|---|---|---|
| | | [0] | [1] | [2] | [3] | [4] | [5] | [6] |
| COMMAND INDEXES | 40 | 1 | 13 | 13 | 30 | 0 | 0 | 0 |
| | 41 | 0 | 0 | 0 | 0 | 0 | 0 | 0 |
| | 42 | 0 | 13 | 13 | 40 | 41 | 41 | 41 |
| | 43 | 0 | 0 | 0 | 0 | 0 | 0 | 0 |
| | 44 | 0 | 0 | 0 | 0 | 0 | 0 | 0 |
| | 45 | 0 | 0 | 0 | 0 | 0 | 0 | 0 |
| | 46 | 0 | 0 | 0 | 0 | 0 | 0 | 0 |
| | 47 | 0 | 0 | 0 | 0 | 0 | 0 | 0 |
| | 48 | 0 | 0 | 0 | 0 | 0 | 0 | 0 |
| | 49 | 0 | 0 | 0 | 0 | 0 | 0 | 0 |
| | 50 | 0 | 0 | 0 | 0 | 0 | 0 | 0 |
| | 51 | 0 | 0 | 0 | 0 | 0 | 0 | 41 |
| | 52 | 0 | 0 | 0 | 0 | 0 | 0 | 0 |
| | 53 | 0 | 0 | 0 | 0 | 0 | 0 | 0 |
| | 54 | 0 | 0 | 0 | 0 | 0 | 0 | 0 |
| | 55 | 0 | 13 | 13 | 32 | 41 | 41 | 0 |
| | 56 | 0 | 13 | 13 | 30 | 41 | 41 | 0 |
| | 57 | 0 | 0 | 0 | 0 | 0 | 0 | 0 |
| | 58 | 0 | 0 | 0 | 0 | 0 | 0 | 0 |
| | 59 | 0 | 0 | 0 | 0 | 0 | 0 | 0 |
| | 60 | 0 | 0 | 0 | 0 | 0 | 0 | 0 |
| | 61 | 0 | 0 | 0 | 0 | 0 | 0 | 0 |
| | 62 | 0 | 0 | 0 | 0 | 0 | 0 | 0 |
| | 63 | 0 | 0 | 0 | 0 | 0 | 0 | 0 |

FIG. 7

RESPONSE CHECK BIT TABLE
CheckBit1[k] (0≦k≦63)

| COMMAND INDEXES | CHECK PATTERNS (hex) | COMMAND INDEXES | CHECK PATTERNS (hex) |
|---|---|---|---|
| 00 | 00D8 0000 | 40 | 00D8 0000 |
| 01 | 00D8 0000 | 41 | 0000 0000 |
| 02 | 00D8 0000 | 42 | 0000 0000 |
| 03 | 00D8 0000 | 43 | 0000 0000 |
| 04 | 00D8 0000 | 44 | 0000 0000 |
| 05 | 0000 0000 | 45 | 0000 0000 |
| 06 | 0000 0000 | 46 | 0000 0000 |
| 07 | 00D8 0000 | 47 | 0000 0000 |
| 08 | 0000 0000 | 48 | 0000 0000 |
| 09 | 00D8 0000 | 49 | 0000 0000 |
| 10 | 00D8 0000 | 50 | 0000 0000 |
| 11 | C0FC 0000 | 51 | 0000 0000 |
| 12 | 00FE 0000 | 52 | 0000 0000 |
| 13 | CCFE 0000 | 53 | 0000 0000 |
| 14 | 0000 0000 | 54 | 0000 0000 |
| 15 | 00D8 0000 | 55 | 0000 0000 |
| 16 | 20D8 0000 | 56 | 0000 0000 |
| 17 | C0F8 0000 | 57 | 0000 0000 |
| 18 | C0F8 0000 | 58 | 0000 0000 |
| 19 | 0000 0000 | 59 | 0000 0000 |
| 20 | C4DA 0000 | 60 | 0000 0000 |
| 21 | 0000 0000 | 61 | 0000 0000 |
| 22 | 0000 0000 | 62 | 0000 0000 |
| 23 | 00D8 0000 | 63 | 0000 0000 |
| 24 | C4D8 0000 | | |
| 25 | C4D8 0000 | | |
| 26 | 00D9 0000 | | |
| 27 | 00D8 0000 | | |
| 28 | 80D8 0000 | | |
| 29 | 80D8 0000 | | |
| 30 | 80D8 0000 | | |
| 31 | 0000 0000 | | |
| 32 | 98D8 0000 | | |
| 33 | 98D8 0000 | | |
| 34 | 98D8 0000 | | |
| 35 | 98D8 0000 | | |
| 36 | 98D8 0000 | | |
| 37 | 98D8 0000 | | |
| 38 | 10D8 0000 | | |
| 39 | 00D8 0000 | | |

FIG. 9

RESPONSE CHECK BIT TABLE
CheckBit2[k] (0≦k≦63)

| COMMAND INDEXES | CHECK PATTERNS (hex) | COMMAND INDEXES | CHECK PATTERNS (hex) |
|---|---|---|---|
| 00 | 00D8 0000 | 40 | 00D8 0000 |
| 01 | 00D8 0000 | 41 | 0000 0000 |
| 02 | 00D8 0000 | 42 | 0000 0000 |
| 03 | 00D8 0000 | 43 | 0000 0000 |
| 04 | 00D8 0000 | 44 | 0000 0000 |
| 05 | 0000 0000 | 45 | 0000 0000 |
| 06 | 0000 0000 | 46 | 0000 0000 |
| 07 | 00D8 0000 | 47 | 0000 0000 |
| 08 | 0000 0000 | 48 | 0000 0000 |
| 09 | 00D8 0000 | 49 | 0000 0000 |
| 10 | 00D8 0000 | 50 | 0000 0000 |
| 11 | C0FC 0000 | 51 | 0000 0000 |
| 12 | 00FE 0000 | 52 | 0000 0000 |
| 13 | CCFE 0000 | 53 | 0000 0000 |
| 14 | 0000 0000 | 54 | 0000 0000 |
| 15 | 00D8 0000 | 55 | 0000 0000 |
| 16 | 20D8 0000 | 56 | 0000 0000 |
| 17 | C0F8 0000 | 57 | 0000 0000 |
| 18 | C0F8 0000 | 58 | 0000 0000 |
| 19 | 0000 0000 | 59 | 0000 0000 |
| 20 | C4DA 0000 | 60 | 0000 0000 |
| 21 | 0000 0000 | 61 | 0000 0000 |
| 22 | 0000 0000 | 62 | 0000 0000 |
| 23 | 00D8 0000 | 63 | 0000 0000 |
| 24 | C4D8 0000 | | |
| 25 | C4D8 0000 | | |
| 26 | 00D9 0000 | | |
| 27 | 00D8 0000 | | |
| 28 | 80D8 0000 | | |
| 29 | 80D8 0000 | | |
| 30 | 80D8 0000 | | |
| 31 | 0000 0000 | | |
| 32 | 98D8 0000 | | |
| 33 | 98D8 0000 | | |
| 34 | 98D8 0000 | | |
| 35 | 98D8 0000 | | |
| 36 | 98D8 0000 | | |
| 37 | 98D8 0000 | | |
| 38 | 10D8 0000 | | |
| 39 | 00D8 0000 | | |

FIG.10

RESPONSE CHECK BIT TABLE
CheckBit3[k] (0≦k≦63)

| COMMAND INDEXES | CHECK PATTERNS (hex) | | COMMAND INDEXES | CHECK PATTERNS (hex) |
|---|---|---|---|---|
| 00 | 01D8 0000 | | 40 | 01D8 0000 |
| 01 | 01D8 0000 | | 41 | 0000 0000 |
| 02 | 01D8 0000 | | 42 | 01D8 0000 |
| 03 | 01D8 0000 | | 43 | 0000 0000 |
| 04 | 01D8 0000 | | 44 | 0000 0000 |
| 05 | 0000 0000 | | 45 | 0000 0000 |
| 06 | 0000 0000 | | 46 | 0000 0000 |
| 07 | 01D8 0000 | | 47 | 0000 0000 |
| 08 | 0000 0000 | | 48 | 0000 0000 |
| 09 | 01D8 0000 | | 49 | 0000 0000 |
| 10 | 01D8 0000 | | 50 | 0000 0000 |
| 11 | C1FC 0000 | | 51 | 0000 0000 |
| 12 | 01FE 0000 | | 52 | 0000 0000 |
| 13 | CDFE 0000 | | 53 | 0000 0000 |
| 14 | 0000 0000 | | 54 | 0000 0000 |
| 15 | 01D8 0000 | | 55 | 01D8 0000 |
| 16 | 21D8 0000 | | 56 | 01D8 0000 |
| 17 | C1F8 0000 | | 57 | 0000 0000 |
| 18 | C1F8 0000 | | 58 | 0000 0000 |
| 19 | 0000 0000 | | 59 | 0000 0000 |
| 20 | C5DA 0000 | | 60 | 0000 0000 |
| 21 | 0000 0000 | | 61 | 0000 0000 |
| 22 | 0000 0000 | | 62 | 0000 0000 |
| 23 | 01D8 0000 | | 63 | 0000 0000 |
| 24 | C5D8 0000 | | | |
| 25 | C5D8 0000 | | | |
| 26 | 01D9 0000 | | | |
| 27 | 01D8 0000 | | | |
| 28 | 81D8 0000 | | | |
| 29 | 81D8 0000 | | | |
| 30 | 81D8 0000 | | | |
| 31 | 0000 0000 | | | |
| 32 | 99D8 0000 | | | |
| 33 | 99D8 0000 | | | |
| 34 | 99D8 0000 | | | |
| 35 | 99D8 0000 | | | |
| 36 | 99D8 0000 | | | |
| 37 | 99D8 0000 | | | |
| 38 | 11D8 0000 | | | |
| 39 | 01D8 0000 | | | |

FIG.11

RESPONSE CHECK BIT TABLE
CheckBit4[k] (0≦k≦63)

| COMMAND INDEXES | CHECK PATTERNS (hex) | COMMAND INDEXES | CHECK PATTERNS (hex) |
|---|---|---|---|
| 00 | 01D8 0000 | 40 | 01D8 0000 |
| 01 | 01D8 0000 | 41 | 0000 0000 |
| 02 | 01D8 0000 | 42 | 01D8 0000 |
| 03 | 01D8 0000 | 43 | 0000 0000 |
| 04 | 01D8 0000 | 44 | 0000 0000 |
| 05 | 0000 0000 | 45 | 0000 0000 |
| 06 | 0000 0000 | 46 | 0000 0000 |
| 07 | 01D8 0000 | 47 | 0000 0000 |
| 08 | 0000 0000 | 48 | 0000 0000 |
| 09 | 01D8 0000 | 49 | 0000 0000 |
| 10 | 01D8 0000 | 50 | 0000 0000 |
| 11 | C1FC 0000 | 51 | 0000 0000 |
| 12 | 01DE 0000 | 52 | 0000 0000 |
| 13 | CDDE 0000 | 53 | 0000 0000 |
| 14 | 0000 0000 | 54 | 0000 0000 |
| 15 | 00D8 0000 | 55 | 01D8 0000 |
| 16 | 21D8 0000 | 56 | 01D8 0000 |
| 17 | C1F8 0000 | 57 | 0000 0000 |
| 18 | C1F8 0000 | 58 | 0000 0000 |
| 19 | 0000 0000 | 59 | 0000 0000 |
| 20 | C5DA 0000 | 60 | 0000 0000 |
| 21 | 0000 0000 | 61 | 0000 0000 |
| 22 | 0000 0000 | 62 | 0000 0000 |
| 23 | 01D8 0000 | 63 | 0000 0000 |
| 24 | C5D8 0000 | | |
| 25 | C5D8 0000 | | |
| 26 | 01D9 0000 | | |
| 27 | 01D8 0000 | | |
| 28 | 81D8 0000 | | |
| 29 | 81D8 0000 | | |
| 30 | 81D8 0000 | | |
| 31 | 0000 0000 | | |
| 32 | 0000 0000 | | |
| 33 | 0000 0000 | | |
| 34 | 0000 0000 | | |
| 35 | 99D8 0000 | | |
| 36 | 99D8 0000 | | |
| 37 | 0000 0000 | | |
| 38 | 11D8 0000 | | |
| 39 | 01D8 0000 | | |

FIG.12

RESPONSE CHECK BIT TABLE
CheckBit5[k] (0≦k≦63)

| COMMAND INDEXES | CHECK PATTERNS (hex) | | COMMAND INDEXES | CHECK PATTERNS (hex) |
|---|---|---|---|---|
| 00 | 0098 0000 | | 40 | 00D8 2000 |
| 01 | 00C8 0000 | | 41 | 0000 0000 |
| 02 | 00C8 0000 | | 42 | 01D8 2000 |
| 03 | 00D8 0000 | | 43 | 0000 0000 |
| 04 | 00D8 0000 | | 44 | 0000 0000 |
| 05 | 0000 0000 | | 45 | 0000 0000 |
| 06 | 00D8 2080 | | 46 | 0000 0000 |
| 07 | 00D8 2000 | | 47 | 0000 0000 |
| 08 | 00D8 2000 | | 48 | 0000 0000 |
| 09 | 00D8 2000 | | 49 | 0000 0000 |
| 10 | 00D8 2000 | | 50 | 0000 0000 |
| 11 | 80FC 2000 | | 51 | 0000 0000 |
| 12 | 00D8 0000 | | 52 | 0000 0000 |
| 13 | 00D8 0000 | | 53 | 0000 0000 |
| 14 | 00D8 2000 | | 54 | 0000 0000 |
| 15 | 0098 2000 | | 55 | 0098 2000 |
| 16 | 20D8 2000 | | 56 | 00D8 2000 |
| 17 | E0F8 2000 | | 57 | 0000 0000 |
| 18 | E0F8 2000 | | 58 | 0000 0000 |
| 19 | 00D8 2000 | | 59 | 0000 0000 |
| 20 | 84DA 2000 | | 60 | 0000 0000 |
| 21 | 0000 0000 | | 61 | 0000 0000 |
| 22 | 0000 0000 | | 62 | 0000 0000 |
| 23 | 00D8 2000 | | 63 | 0000 0000 |
| 24 | E4D8 2000 | | | |
| 25 | E4D8 2000 | | | |
| 26 | 00D9 2000 | | | |
| 27 | 00D9 2000 | | | |
| 28 | 80D8 2000 | | | |
| 29 | 80D8 2000 | | | |
| 30 | 80D8 2000 | | | |
| 31 | 0000 0000 | | | |
| 32 | 0000 0000 | | | |
| 33 | 0000 0000 | | | |
| 34 | 0000 0000 | | | |
| 35 | 98D8 0000 | | | |
| 36 | 98D8 0000 | | | |
| 37 | 0000 0000 | | | |
| 38 | 10D8 8000 | | | |
| 39 | 00D8 2000 | | | |

FIG.13

RESPONSE CHECK BIT TABLE
CheckBit6[k] (0≦k≦63)

| COMMAND INDEXES | CHECK PATTERNS (hex) | | COMMAND INDEXES | CHECK PATTERNS (hex) |
|---|---|---|---|---|
| 00 | 0000 0000 | | 40 | 0000 0000 |
| 01 | 0000 0000 | | 41 | 0000 0000 |
| 02 | 0000 0000 | | 42 | 0DFF 0000 |
| 03 | 00C8 0000 | | 43 | 0000 0000 |
| 04 | 0000 0000 | | 44 | 0000 0000 |
| 05 | 0000 0000 | | 45 | 0000 0000 |
| 06 | 0000 0000 | | 46 | 0000 0000 |
| 07 | 0DFF 0000 | | 47 | 0000 0000 |
| 08 | 0000 0000 | | 48 | 0000 0000 |
| 09 | 0000 0000 | | 49 | 0000 0000 |
| 10 | 0000 0000 | | 50 | 0000 0000 |
| 11 | 0000 0000 | | 51 | 0000 0000 |
| 12 | C4FE 0000 | | 52 | 0000 0000 |
| 13 | CDFF 0000 | | 53 | 0000 0000 |
| 14 | 0000 0000 | | 54 | 0000 0000 |
| 15 | 0000 0000 | | 55 | 0DFF 0000 |
| 16 | 2DFF 0000 | | 56 | 0DFF 0000 |
| 17 | CDFF 0000 | | 57 | 0000 0000 |
| 18 | CDFF 0000 | | 58 | 0000 0000 |
| 19 | 0000 0000 | | 59 | 0000 0000 |
| 20 | 0000 0000 | | 60 | 0000 0000 |
| 21 | 0000 0000 | | 61 | 0000 0000 |
| 22 | 0000 0000 | | 62 | 0000 0000 |
| 23 | 0000 0000 | | 63 | 0000 0000 |
| 24 | CDFF 0000 | | | |
| 25 | CDFF 0000 | | | |
| 26 | 0DFF 0000 | | | |
| 27 | 0DFF 0000 | | | |
| 28 | 8DFF 0000 | | | |
| 29 | 8DFF 0000 | | | |
| 30 | 8DFF 0000 | | | |
| 31 | 0000 0000 | | | |
| 32 | 9DFF 0000 | | | |
| 33 | 9DFF 0000 | | | |
| 34 | 0000 0000 | | | |
| 35 | 0000 0000 | | | |
| 36 | 0000 0000 | | | |
| 37 | 0000 0000 | | | |
| 38 | 1DFF 0000 | | | |
| 39 | 0000 0000 | | | |

FIG.14

RESPONSE CHECK BIT TABLE
CheckBit7[k] (0≦k≦63)

| COMMAND INDEXES | CHECK PATTERNS (hex) | COMMAND INDEXES | CHECK PATTERNS (hex) |
|---|---|---|---|
| 00 | 0000 0000 | 40 | 0000 0000 |
| 01 | 0000 0000 | 41 | 0000 0000 |
| 02 | 0000 0000 | 42 | 0DFF 0000 |
| 03 | 00C8 0000 | 43 | 0000 0000 |
| 04 | 0000 0000 | 44 | 0000 0000 |
| 05 | 0000 0000 | 45 | 0000 0000 |
| 06 | 81FE 0000 | 46 | 0000 0000 |
| 07 | 0DFF 0000 | 47 | 0000 0000 |
| 08 | 0000 0000 | 48 | 0000 0000 |
| 09 | 0000 0000 | 49 | 0000 0000 |
| 10 | 0000 0000 | 50 | 0000 0000 |
| 11 | 0000 0000 | 51 | 0000 0000 |
| 12 | C4FE 0000 | 52 | 0000 0000 |
| 13 | CDFF 0000 | 53 | 0000 0000 |
| 14 | 0000 0000 | 54 | 0000 0000 |
| 15 | 0000 0000 | 55 | 0DFF 0000 |
| 16 | 2DFF 0000 | 56 | 0DFF 0000 |
| 17 | CDFF 0000 | 57 | 0000 0000 |
| 18 | CDFF 0000 | 58 | 0000 0000 |
| 19 | 0000 0000 | 59 | 0000 0000 |
| 20 | 0000 0000 | 60 | 0000 0000 |
| 21 | 0000 0000 | 61 | 0000 0000 |
| 22 | 0000 0000 | 62 | 0000 0000 |
| 23 | 0000 0000 | 63 | 0000 0000 |
| 24 | EDFF 0000 | | |
| 25 | EDFF 0000 | | |
| 26 | 0DFF 0000 | | |
| 27 | 0DFF 0000 | | |
| 28 | 8DFF 0000 | | |
| 29 | 8DFF 0000 | | |
| 30 | 8DFF 0000 | | |
| 31 | 0000 0000 | | |
| 32 | 9DFF 0000 | | |
| 33 | 9DFF 0000 | | |
| 34 | 0000 0000 | | |
| 35 | 0000 0000 | | |
| 36 | 0000 0000 | | |
| 37 | 0000 0000 | | |
| 38 | 1DFF 0000 | | |
| 39 | 0000 0000 | | |

FIG.15

RESPONSE CHECK BIT TABLE
CheckBit8[k] (0≦k≦63)

| COMMAND INDEXES | CHECK PATTERNS (hex) | COMMAND INDEXES | CHECK PATTERNS (hex) |
|---|---|---|---|
| 00 | 0000 0000 | 40 | 0000 0000 |
| 01 | 0000 0000 | 41 | 0000 0000 |
| 02 | 0000 0000 | 42 | 0DFF 0000 |
| 03 | 00C8 0000 | 43 | 0000 0000 |
| 04 | 0000 0000 | 44 | 0000 0000 |
| 05 | 0000 0000 | 45 | 0000 0000 |
| 06 | 81FE 0000 | 46 | 0000 0000 |
| 07 | 0DFF 0000 | 47 | 0000 0000 |
| 08 | 0000 0000 | 48 | 0000 0000 |
| 09 | 0000 0000 | 49 | 0000 0000 |
| 10 | 0000 0000 | 50 | 0000 0000 |
| 11 | 0000 0000 | 51 | 0000 0000 |
| 12 | C4FE 0000 | 52 | 0000 0000 |
| 13 | CDFF 0000 | 53 | 0000 0000 |
| 14 | 0000 0000 | 54 | 0000 0000 |
| 15 | 0000 0000 | 55 | 0DFF 0000 |
| 16 | 2DFF 0000 | 56 | 0DFF 0000 |
| 17 | CDFF 0000 | 57 | 0000 0000 |
| 18 | CDFF 0000 | 58 | 0000 0000 |
| 19 | 0000 0000 | 59 | 0000 0000 |
| 20 | 0000 0000 | 60 | 0000 0000 |
| 21 | 0000 0000 | 61 | 0000 0000 |
| 22 | 0000 0000 | 62 | 0000 0000 |
| 23 | 0000 0000 | 63 | 0000 0000 |
| 24 | EDFF 0000 | | |
| 25 | EDFF 0000 | | |
| 26 | 0DFF 0000 | | |
| 27 | 0DFF 0000 | | |
| 28 | 8DFF 0000 | | |
| 29 | 8DFF 0000 | | |
| 30 | 8DFF 0000 | | |
| 31 | 0000 0000 | | |
| 32 | 9DFF 0000 | | |
| 33 | 9DFF 0000 | | |
| 34 | 0000 0000 | | |
| 35 | 0000 0000 | | |
| 36 | 0000 0000 | | |
| 37 | 0000 0000 | | |
| 38 | 1DFF 0000 | | |
| 39 | 0000 0000 | | |

FIG.16

RESPONSE CHECK BIT TABLE
CheckBit9[k] (0≦k≦1)

| | | CHECK PATTERNS (hex) |
|---|---|---|
| COMMAND INDEXES | 06 | 8DFF 0000 |
| | EXCEPT FOR 06 | 0DFF 0000 |

FIG.17

IMMEDIATELY-PRECEDING COMMAND RESPONSE CHECK BIT MASK TABLE
Mask[m] (0≦m≦6)

| MMC 1.x | MMC 2.x | MMC 3.x | MMC 4.x | SD 1.01 | SD 1.10 2.00 | SD ACMD |
|---|---|---|---|---|---|---|
| [0] | [1] | [2] | [3] | [4] | [5] | [6] |
| 4C3E 0000 | 4D3F 0000 | 4D3F 0000 | CD2F 8040 | 8D39 0000 | ED39 8000 | ED39 8000 |

FIG.18

PROGRAM AND METHOD FOR ERROR DETERMINATION, AND ELECTRONIC APPARATUS

The entire disclosure of Japanese Patent Application No. 2007-135257, filed May 22, 2007 is expressly incorporated by reference herein.

BACKGROUND

1. Technical Field

The present invention relates to an electronic apparatus capable of installing a plurality of devices with different formats, as well as to an error determination program and an error determination method executed by the electronic apparatus.

2. Related Art

Among external storage media for personal computers, multifunctional terminals and the like, there are widely known MultiMediaCards (MMC) (registered trademark) standardized by the MultiMediaCard Association (MMCA), the MMC standardization body, and Secure Digital (SD) cards (registered trademark) standardized by the SD Card Association (SDA). Those cards are used to record still images of digital video cameras, data of mobile phones, music of mobile music players, and the like.

JP-A-2002-342256 is an example of related art, which discloses a data processor and the like easily adaptable to additions and changes in an interface specification such as a command specification for an interface-controllable device.

As described above, presently, there are various cards used as the storage media. Specifications of those cards each include a plurality of versions, and the respective specifications and versions of the cards provide a large number of commands. Thus, response error determination processing is required according to various combinations of kinds, versions, commands, and the like of the cards. This increases determining points, thereby making the processing complicated and slow.

SUMMARY

An advantage of the invention is to provide an error determination program, an error determination method, and an electronic apparatus, which can simplify processing by the electronic apparatus or the like capable of installing the above cards and can reduce processing load.

In order to solve the problems, according to a first aspect of the present invention, there is provided an error determination program executed by an information processor in an electronic apparatus that includes a device installation section capable of installing any one of a plurality of devices having different formats, a host controller acting as an intermediary between the information processor and the device installed in the device installation section, and a storage circuit storing an error determination information table that includes a plurality of pieces of error determination information for determining a presence or absence of any error in a plurality of responses to a plurality of commands from the devices installable in the device installation section, by associating the pieces of error determination information with a combination of the formats of the installable devices and the commands executable by the devices. The program includes instructing the host controller to issue a desired command in the commands executable by the device installed in the device installation section to the device, acquiring the error determination information associated with the combination of the format of the installed device and the desired command from the error determination information table, acquiring response content information regarding a content of a response to the desired command from the installed device from the host controller, and determining the presence or absence of any error in the response based on the error determination information and the response content information.

In the program of the first aspect, the presence or absence of any error in the response can be easily determined based on the error determination information associated with the combination of the format of the device and the desired command and the response content information regarding the content of the response to the desired command. This can simplify processing and can reduce the amount of codes, thereby improving program readability and processing rate.

In the error determination program according to the first aspect, preferably, the error determination information specifies a single or a plurality of error-related portions in the response content information, and the information processor determines the presence or absence of any error in the response based on the single or the plurality of error-related portions specified by the error determination information.

In the above program, processing is performed on the error-related portions in the response content information, whereby it can be surely determined whether any error is present or not.

In the error determination program according to the first aspect, preferably, the device installation section can install the devices of a plurality of kinds, specifications, standards, and/or versions; the error determination information table stored in the storage circuit includes the pieces of error determination information for determining the presence or absence of any error in the responses to the commands from the devices installable in the device installation section, by associating the pieces of error determination information with a combination of the kinds, the specifications, the standards, and/or the versions of the installable devices and the commands executable by the installable devices; and the information processor acquires the error determination information associated with the combination of the kind, the specification, the standard, and/or the version of the device installed in the device installation section and the desired command from the error determination information table.

In the error determination program above, error determination can also be easily performed in the devices of the plurality of kinds, specifications, standards, and/or versions. Thus, the program is adaptable to a wide range of devices.

In the error determination program according to the first aspect, preferably, at least one of the pieces of the error determination information included in the error determination information table stored in the storage circuit is associated with a plurality of combinations of the formats of the devices installable in the device installation section and the commands executable by the installable devices.

In the above program, the error determination information can be shared between the plurality of the formats and/or the commands. Accordingly, the size of the error determination information table can be small and thus the scale of the storage circuit can be reduced.

In the error determination program according to the first aspect, preferably, the storage circuit further stores an error determination information specifying information table that includes a plurality of pieces of error determination information specifying information for specifying the pieces of error determination information in the error determination information table by associating the pieces of error determination information specifying information with a combination of a plurality of pieces of format specifying information that specifies each of the formats of the devices installable in the device installation section and a plurality of pieces of command specifying information that specifies each of the commands executable by the installable devices, and the information processor acquires the error determination information specifying information associated with the combination of the format specifying information for specifying the format of the device installed in the device installation section and the command specifying information for specifying the desired command from the error determination information specifying information table to acquire the error determination information specified by the acquired error determination information specifying information from the error determination information table.

The above program enables rapid and easy acquisition of the error determination information associated with the combination of the format specifying information and the command specifying information, thereby improving processing rate.

In the error determination program according to the first aspect, preferably, when the presence of any error in the response is determined, the information processor further specifies the content of the error present in the response based on the error determination information and the response content information.

In the above program, first, the presence or absence of any error can be determined and if any error is present, the error content can be specified. Thus, if there is no error, unnecessary processing can be avoided, thereby improving processing rate.

In the error determination program according to the first aspect, preferably, the error determination information is a bit pattern, and the information processor performs a logical product calculation of the error determination information and the response content information to determine the presence or absence of any error in the response depending on whether a calculation result is equal to zero.

In the above program, the simple and easy calculation processing enables determination of the presence or absence of any error, thereby improving processing rate.

In the error determination program according to the first aspect, preferably, the storage circuit stores a plurality of error determination information tables that correspond to each of the formats of the devices installable in the device installation section and that include each of the pieces of error determination information for determining the presence or absence of any error in the responses to the commands executable by the installable devices; and the information processor selects an error determination information table corresponding to the format of the device installed in the device installation section from the plurality of error determination information tables to acquire the error determination information for determining the presence or absence of any error in the response to the desired command from the selected error determination information table so as to determine the presence or absence of any error in the response based on the error determination information and the response content information.

In the program above, the presence or absence of any error in the response can be determined with a small frequency of reference to the tables and with small amounts of time and codes.

In the error determination program according to the first aspect, preferably, the storage circuit further stores an immediately-preceding command error determination information table that includes a plurality of pieces of immediately-preceding command error determination information for determining whether any error of a command issued immediately before a single command in the plurality of commands is present or not in a response to the single command upon issuing the commands to any one of the devices installable in the device installation section, by associating the pieces of immediately-preceding command error determination information with the formats of the devices installable in the device installation section; and the information processor acquires the immediately-preceding command error determination information associated with the format of the device installed in the device installation section from the immediately-preceding command error determination information table so as to determine the presence or absence of any error in the response to the desired command based on the error determination information associated with the combination of the format of the installed device and the desired command, the response content information, the immediately-preceding command error determination information, and the error determination information associated with the combination of the format of the installed device and the command issued immediately before the desired command.

In the above program, even when the error of the command issued immediately before the desired command is set in the response to the desired command, the presence or absence of any error can be rapidly and easily determined.

In the error determination program according to the first aspect, preferably, after determining the presence or absence of any error in the response to the command issued immediately before the desired command, the information processor generates or updates and stores immediately-preceding command check information for determining whether any error of the command immediately before the desired command is present or not in the response to the desired command, based on the error determination information associated with the combination of the format of the device installed in the device installation section and the command immediately before the desired command and the immediately-preceding command error determination information associated with the format of the device installed in the device installation section to acquire response content information regarding the content of the response to the desired command of the installed device from the host controller so as to determine the presence or absence of any error in the response to the desired command based on the error determination information associated with the combination of the format of the installed device and the desired command, the response content information, and the immediately-preceding command check information.

In the above program, the presence or absence of any error of the command issued immediately before the desired command can be more rapidly determined.

According to a second aspect of the invention, there is provided an error determination method executed by an information processor included in an electronic apparatus that includes a device installation section capable of installing any one of a plurality of devices having different formats, a host controller acting as an intermediary between the information processor and the device installed in the device installation section, and a storage circuit storing an error determination information table that includes a plurality of pieces of error determination information for determining a presence or absence of any error in a plurality of responses to the commands from the devices installable in the device installation section, by associating the pieces of error determination information with a combination of the formats of the installable devices and a plurality of commands executable by the installable devices. The method includes instructing the host controller to issue a desired command in the commands executable by the device installed in the device installation section to the installed device, acquiring the error determination information associated with the combination of the format of the installed device and the desired command from the error determination information table, acquiring response content information regarding a content of a response to the desired command from the installed device from the host controller, and determining the presence or absence of any error in the response based on the error determination information and the response content information.

According to a third aspect of the invention, an electronic apparatus including an information processor, a device installation section capable of installing any one of a plurality of devices having different formats, a host controller acting as an intermediary between the information processor and the device installed in the device installation section, and a storage circuit storing an error determination information table that includes a plurality of pieces of error determination information for determining a presence or absence of any error in a plurality of responses to a plurality of commands from the devices installable in the device installation section, by associating the pieces of error determination information with a combination of the formats of the installable devices and the commands executable by the installable devices. The information processor instructs the host controller to issue a desired command in the commands executable by the device installed in the device installation section to the installed device, acquires the error determination information associated with the combination of the format of the installed device and the desired command from the error determination information table, acquires response content information regarding a content of a response to the desired command from the installed device from the host controller, and determines the presence or absence of any error in the response based on the error determination information and the response content information.

In the above electronic apparatus, preferably, the store circuit further stores an error determination information specifying information table that includes a plurality of pieces of error determination information specifying information for specifying the pieces of error determination information in the error determination information table, by associating the pieces of error determination information specifying information with a combination of a plurality of pieces of format specifying information for specifying each of the formats of the devices installable in the device installation section and a plurality of pieces of command specifying information for specifying each of the commands executable by the installable devices; and the information processor acquires the error determination information specifying information associated with the combination of the format specifying information for specifying the format of the device installed in the device installation section and the command specifying information for specifying the desired command from the error determination information specifying information table so as to acquire the error determination information specified by the acquired error determination information specifying information from the error determination information table.

Preferably, the electronic apparatus of the third aspect further includes a communication circuit to update and/or rewrite at least one of the error determination information table and the error determination information specifying information table in the storage circuit via the communication circuit.

The above electronic apparatus is flexibly adaptable to additions and changes in the formats and commands of devices, debugging of the error determination information table and/or the error determination information specifying information table, and the like.

BRIEF DESCRIPTION OF THE DRAWINGS

The invention will be described with reference to the accompanying drawings, wherein like numbers reference like elements.

FIG. 5 is a diagram showing a response check bit table stored in a RAM shown in FIG. 2.

FIG. 6 is a diagram showing a lookup table stored in the RAM.

FIG. 7 is also a diagram showing the above lookup table.

FIG. 9 is a diagram showing a response check bit table stored in the RAM.

FIG. 10 is a diagram showing a response check bit table stored in the RAM.

FIG. 11 is a diagram showing a response check bit table stored in the RAM.

FIG. 12 is a diagram showing a response check bit table stored in the RAM.

FIG. 13 is a diagram showing a response check bit table stored in the RAM.

FIG. 14 is a diagram showing a response check bit table stored in the RAM.

FIG. 15 is a diagram showing a response check bit table stored in the RAM.

FIG. 16 is a diagram showing a response check bit table stored in the RAM.

FIG. 17 is a diagram showing a response check bit table stored in the RAM.

FIG. 18 is a diagram showing an immediately-preceding command response check bit mask table stored in the RAM.

DESCRIPTION OF EXEMPLARY EMBODIMENTS

Embodiments of the invention will be described in detail with reference to the accompanied drawings. The embodiments described below should not unduly limit the scope of the invention described in the claims. Additionally, all of structures explained below are not necessarily essential constituent elements of the invention.

1. Command and Response 1-1. Command

First will be described a command in the specification of an SD card (registered trademark).

Figure 1:
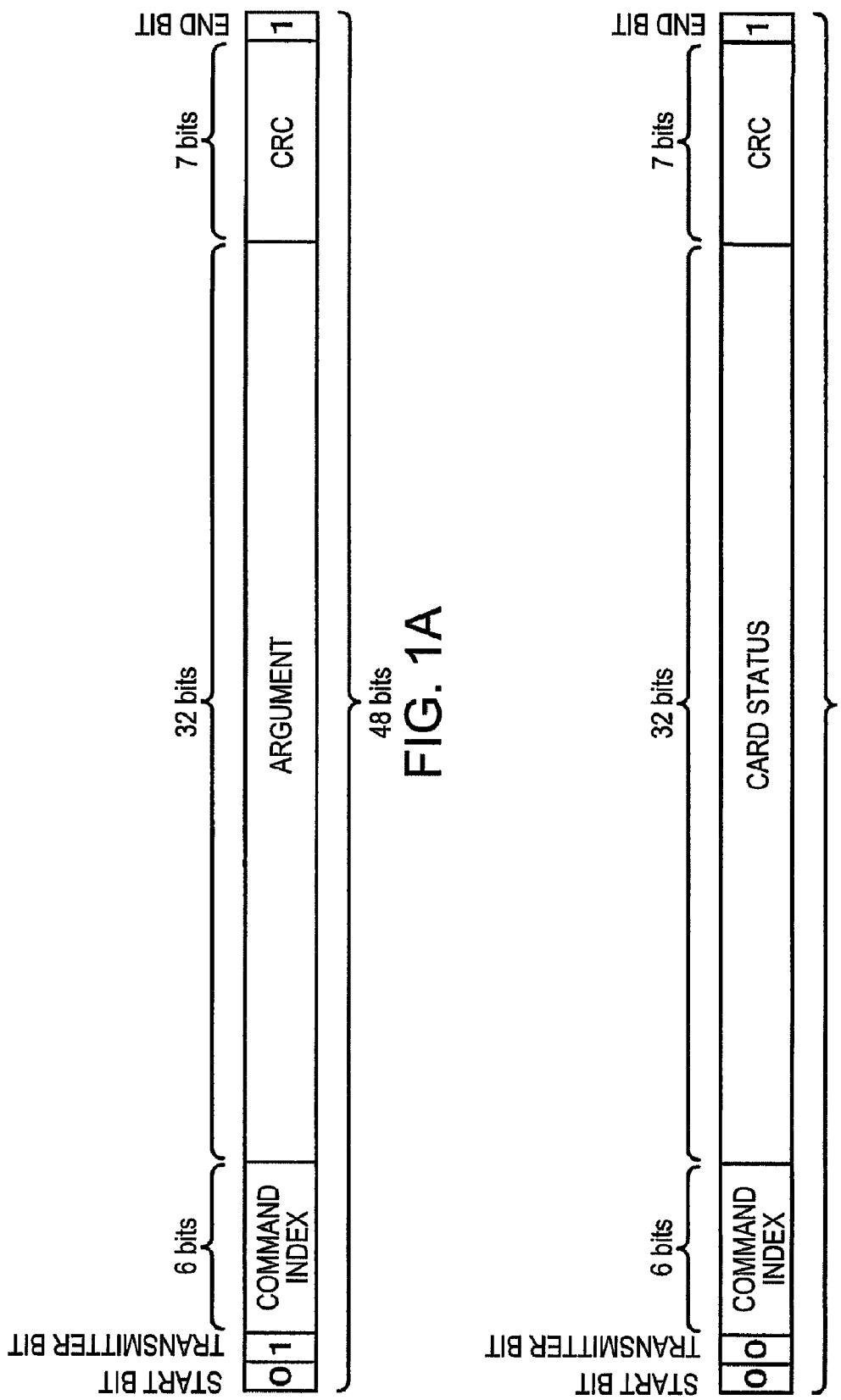
FIGS. 1A and 1B are diagrams showing format examples of a command and a response.

FIG. 1A is a diagram showing a command format used in the specification of the SD card. As shown in the drawing, the command includes a start bit (1 bit), a transmitter bit (1 bit), a command index (6 bits), an argument (32 bits), a cyclic redundancy code (CRC) (7 bits), and an end bit (1 bit), which amount to a total of 48 bits. The 48-bit command is serially transferred from a host circuit to a card via a command signal line CMD.

The transmitter bit is "1" when transmission is from the host circuit to the card as in the command, and is "0" in a transmission from the card to the host circuit as in the response, which will be described below.

The command index of 6 bits in length can have values from 0 (0x00) to 63 (0x3F). The command index specifies each command executed by the card.

The 32-bit argument includes information necessary to execute the command specified by the command index.

The CRC is calculated based on a total of 40 bits including the start bit, the transmitter bit, the command index, and the argument to check a transfer error between the host circuit and the card, and then added following the argument.

The MMC (registered trademark) standard uses the same command format as that in FIG. 1A, although the content of each command specified by the command index is different from that in the SD card.

1-2. Response

Next will be described a response in the specification of the SD card.

FIG. 1B is a diagram showing a response format type "R1" in the response of the SD card specification. As shown in the drawing, the response has a length of a total of 48 bits including a start bit (0 bit), a transmitter bit (1 bit), a command index (6 bits), a card status (32 bits), a CRC (7 bits), and an end bit (1 bit). The 48-bit response is serially transferred from the card to the host circuit via the CMD signal line.

The transmitter bit is "0" in the transmission from the card to the host circuit as in the response.

The 6-bit command index is a repetition of the command index included in the command transmitted from the host circuit to the card.

The 32-bit card status includes information regarding a status in the card that executes the command specified by the command index.

The CRC is calculated based on a total of 40 bits including the start bit, the transmitter bit, the command index, and the argument to check a transfer error between the card and the host circuit, and then added following the card status.

In the specification of the SD card, the foregoing single format (See FIG. 1A) is defined as the command format, whereas response format types "R1b", "R2", "R3", "R6", and "R7" are defined in addition to the foregoing type "R1". It is defined for each command which of the six format types of responses should be returned. It is defined that the response format type "R1" is to be returned to many commands, whereas the other responses format types "R1b", "R2", "R3", "R6", and "R7" are to be returned to a small number of commands. Additionally, there are commands defined as those to which no response is to be returned.

The response type "R1b" has the same format as that of the response type "R1" above (See FIG. 1B), but is different from the type "R1" in that an optional busy signal is output on a data line D0.

The response type "R2" is a response to a command for reading a configurable identification (CID) register (128 bits) or a card-specific data (CSD) register (128 bits) in the card, and has a format with a total length of 136 bits.

The response type "R3" is given to a command for reading an operation condition register (OCR) (32 bits) in the card and has a format with a total length of 48 bits.

The response type "R6" is a response to return a relative card address (RCA) newly issued and has a format with the total length of 48 bits.

The response type "R7" returns the information of voltages supported by the cards and has a format with the total length of 48 bits.

The MMC standard also uses the same response format as that in the SD card standard.

1.3 Error Determination

Some bits of the card status (32 bits) shown in FIG. 1B are unused or reserved (retained for future use), and the remaining bits of the card status are defined as those indicating various statuses in the card. When a command execution causes a single error or a plurality of errors (hereinafter referred to as "card status errors") in the card, a single bit or a plurality of bits corresponding to the single or plurality of errors caused are set to "1". It varies with each command what card status error occurs and thereby which bit is set to "1", which is different among all commands. Thus, the host circuit needs to sequentially check the bits of count and position in accordance with each command issued to the card (hereinafter referred to as "error bits") to determine the card status error, thus increasing determination points. As a result, determination processing becomes complicated and slow. Particularly, in electronic apparatuses capable of accepting different kinds and versions of cards, the positions of error bits vary depending on the kinds and versions of the cards, so that processing becomes more complicated and processing load becomes heavier, thereby causing processing to be more time-consuming.

2. Structure

Figure 2:
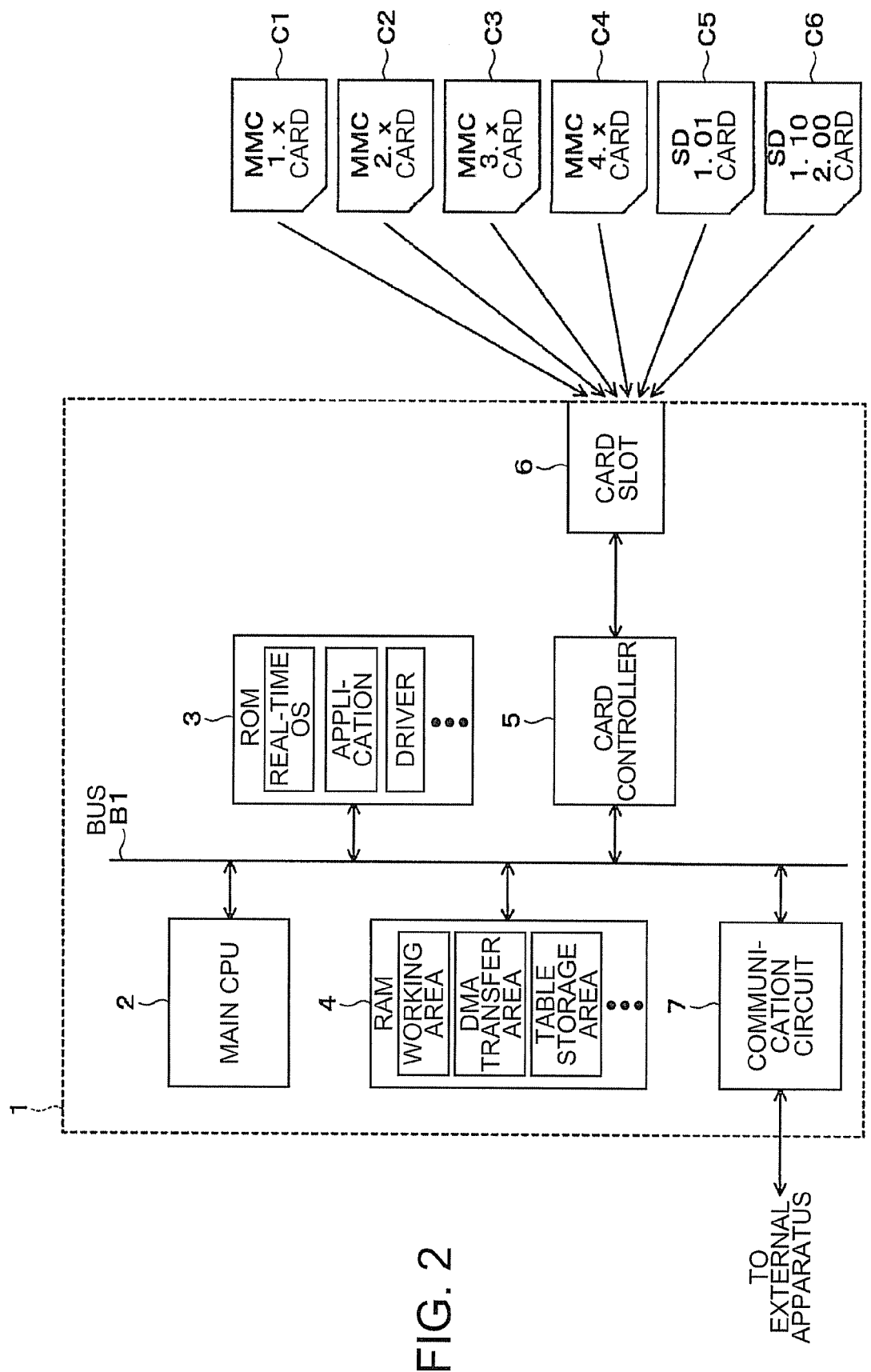
FIG. 2 is a diagram showing a structural example of an electronic apparatus according to an embodiment of the invention.

FIG. 2 shows a structural example of an electronic apparatus 1 according to an embodiment of the invention which can solve the above problems. As shown in the drawing, the electronic apparatus 1 includes a main CPU (broadly, an information processor) that instructs to issue various commands and to transmit data, and executes programs, a ROM 3 that stores programs and data, a RAM (broadly, a storage circuit) 4 that stores data, a card slot (broadly, a device installation section) 6 that allows installation of a plurality of formats (including kinds, specifications, standards, and/or versions) of cards (broadly, devices), a card controller 5 that issues a command, transmits data, and the like to each card installed in the card slot 6 in response to each instruction sent from the main CPU 2, and a communication circuit 7 that performs wired or wireless communications between the circuit and an external apparatus. A bus B1 connects the main CPU 2, the ROM 3, the RAM 4, the card controller 5, and the communication circuit 7 to one another.

For example, the ROM 3 stores a real-time operating system (OS) program, various application programs, driver programs operating the card controller 5, and the like. The main CPU 2 executes those programs according to needs.

The RAM 4 includes a working area used by the main CPU 2 and a direct memory access (DMA) transfer area used for DMA transfer of data between the RAM 4 and a card inserted in the card slot 6. Additionally, the RAM 4 includes a table storage area that stores a response check bit table (broadly, an error determination information table) storing a plurality of check patterns usable to determine card status errors to a plurality of commands of the cards installable in the card slot 6 by associating the check patterns with the formats of the cards installable in the slot and the commands executable by the installable cards, a lookup table (broadly, an error determination information specifying information table) that rapidly determines a desired table element in the response check bit table, and the like. Those tables will be described in detail below.

The card slot 6 allows installation of a card C1 (hereinafter referred to as "a card of a first format") in conformity to the specification versions 1.0 to 1.2 or 1.4 of the MMC, a card C2 (hereinafter as "a card of a second format") in conformity to the specification versions 2.0 to 2.2 of the MMC, a card C3 (hereinafter as "a card of a third format") in conformity to the specification versions 3.0 to 3.31 of the MMC, a card C4 (hereinafter as "a card of a fourth format") in conformity to the specification versions 4.0 to 4.2 of the MMC, a card C5 (hereinafter as "a card of a fifth format") in conformity to the specification version 1.01 of the SD, and a card C6 (hereinafter as "a card of a sixth format") in conformity to the specification versions 1.10 or 2.00 of the SD. In the description of the present specification, those cards are generally referred to as SDMMC cards.

The electronic apparatus of the embodiment can install the cards C1 to C6 of the first to sixth formats, as well as devices of other kinds, specifications, standards, and/or versions (e.g. SDIO and CE-ATA devices).

The format of each card installed in the card slot 6 can be specified based on information obtainable upon booting up and by reading the internal registers of the card, such as the CID and CSD registers. Upon booting up or at an initial time, the main CPU 2 writes data representing the card format specified as above into the RAM 4. For example, when the card C6 of the sixth format is installed in the card slot 6, the main CPU 2 issues a command "CMD 2" (a command index 2 (0x02)) or the like to the card C6 of the sixth format at the initial time so as to read the CID register or the like. The card format can be specified based on the specifications of each card and thus detailed explanation will be omitted.

The card controller 5 serves as an interface between the main CPU 2 and the card installed in the card slot 6 according to an instruction from the main CPU 2. The card controller 5 and the card slot 6 are connected to each other via a CLK line (a clock output signal line), a CMD line (a command signal line), and a DAT line (a data signal line).

The CLK line is a signal line for transmitting a clock signal from the card controller 5 to each of the cards C1 to C6 of the first to the sixth formats. Command transmission from the card controller 5 to those cards of the formats, data transmission between the controller and the cards, and the like are implemented in sync with the clock signal.

The CMD line is a 1-bit-wide signal line used to transmit a command from the card controller 5 to the cards C1 to C6 of the first to the sixth formats and to transmit a response from the cards to the controller.

The DAT line is a bi-directional signal line for data transmission between the card controller 5 and DAT terminals of the cards C1 to C6 of the first to the sixth formats. The cards C1 to C4 of the first to the fourth formats have one, four or eight DAT terminals (a bit width), and the cards C5 and C6 of the fifth and the sixth formats have one or four DAT terminals.

The electronic apparatus 1 may further include an input device, a display device such as a liquid crystal display or an organic EL display, a DMA controller and the like.

Figure 3:
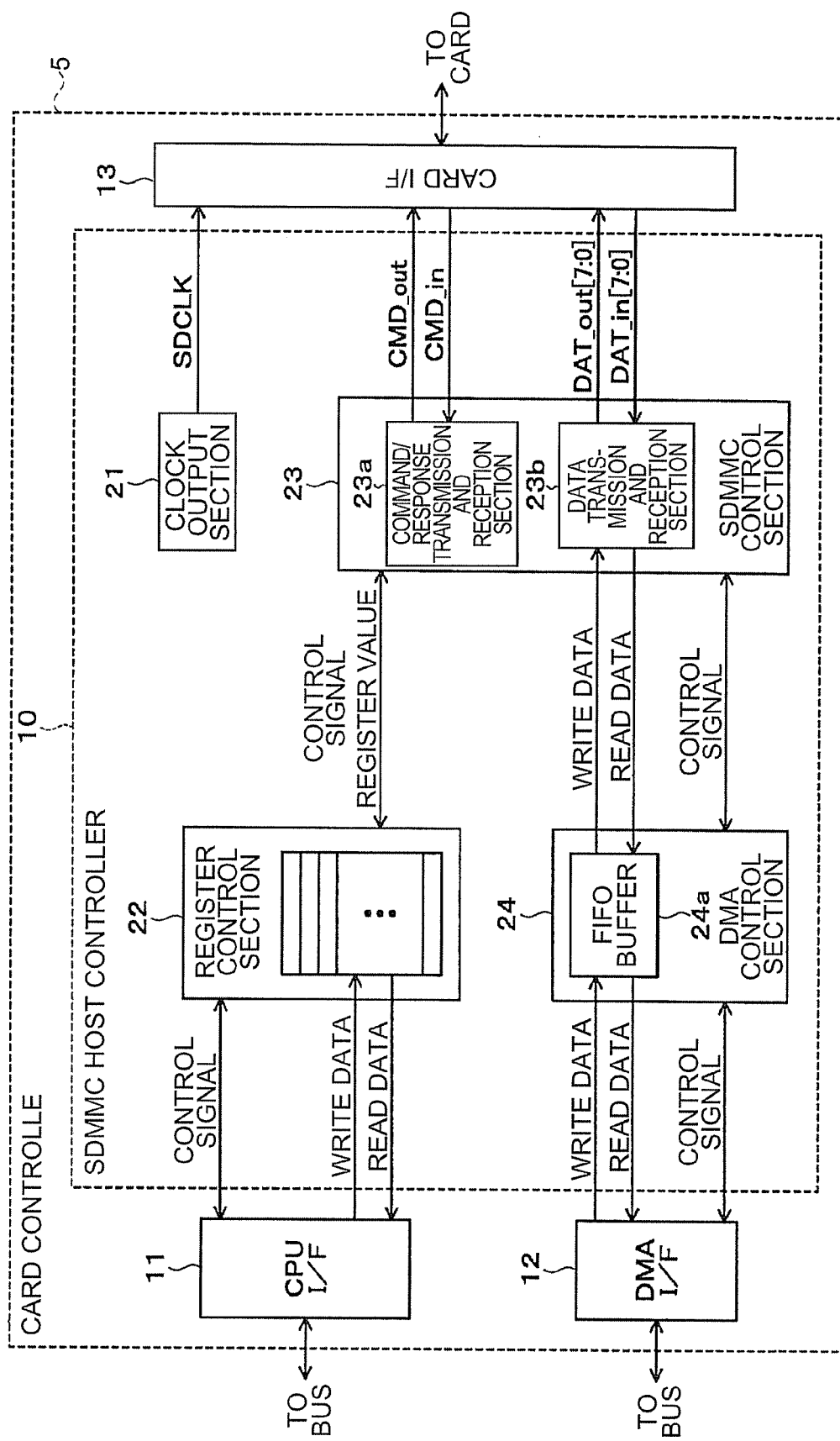
FIG. 3 is a block diagram showing the internal structure of a card controller shown in FIG. 2.

FIG. 3 is a block diagram showing the internal structure of the card controller 5. As shown in the drawing, the card controller 5 includes an SDMMC host controller (broadly, a host controller) 10, a CPU interface 11 used to transmit and receive signals between the SDMMC host controller 10 and the main CPU 2 (See FIG. 2), a DMA interface 12 used to transmit and receive signals between the SDMMC host controller 10 and the RAM 4 (See FIG. 2), and a card interface 13 used to transmit and receive signals between the SDMMC host controller 10 and the card installed in the card slot 6 (See FIG. 2).

The SDMMC host controller 10 includes a clock output section 21, a register control section 22, an SDMMC control section 23, and a DMA control section 24. Additionally, the SDMMC host controller 10 may be integrated on a semiconductor chip to form a semiconductor integrated circuit.

The clock output section 21 outputs a clock signal SDCLK to the card installed in the card slot 6 via the card interface 13. For example, the clock signal SDCLK output to the card can be acquired as a system clock signal generated by an oscillation circuit (not shown) or sent from an external source, or can be acquired by dividing a frequency of the system clock signal. Additionally, the main CPU 2, the SDMMC control section 23, or the like may be able to control starting and stopping of the output of the clock signal SDCLK from the clock output section 21 to the card.

The register control section 22 has a plurality of registers writable and/or readable by the main CPU 2 and controls the registers. The main CPU 2 writes information into the registers via the CPU interface 11 to allow the SDMMC host controller 10 to issue a command to the card. Additionally, the main CPU 2 reads information from the registers via the CPU interface 11 to acquire the card's response to the issued command. Alternatively, the registers of the register control section 22 may write into and/or read from another internal circuit block of the SDMMC host controller 10.

Figure 4:
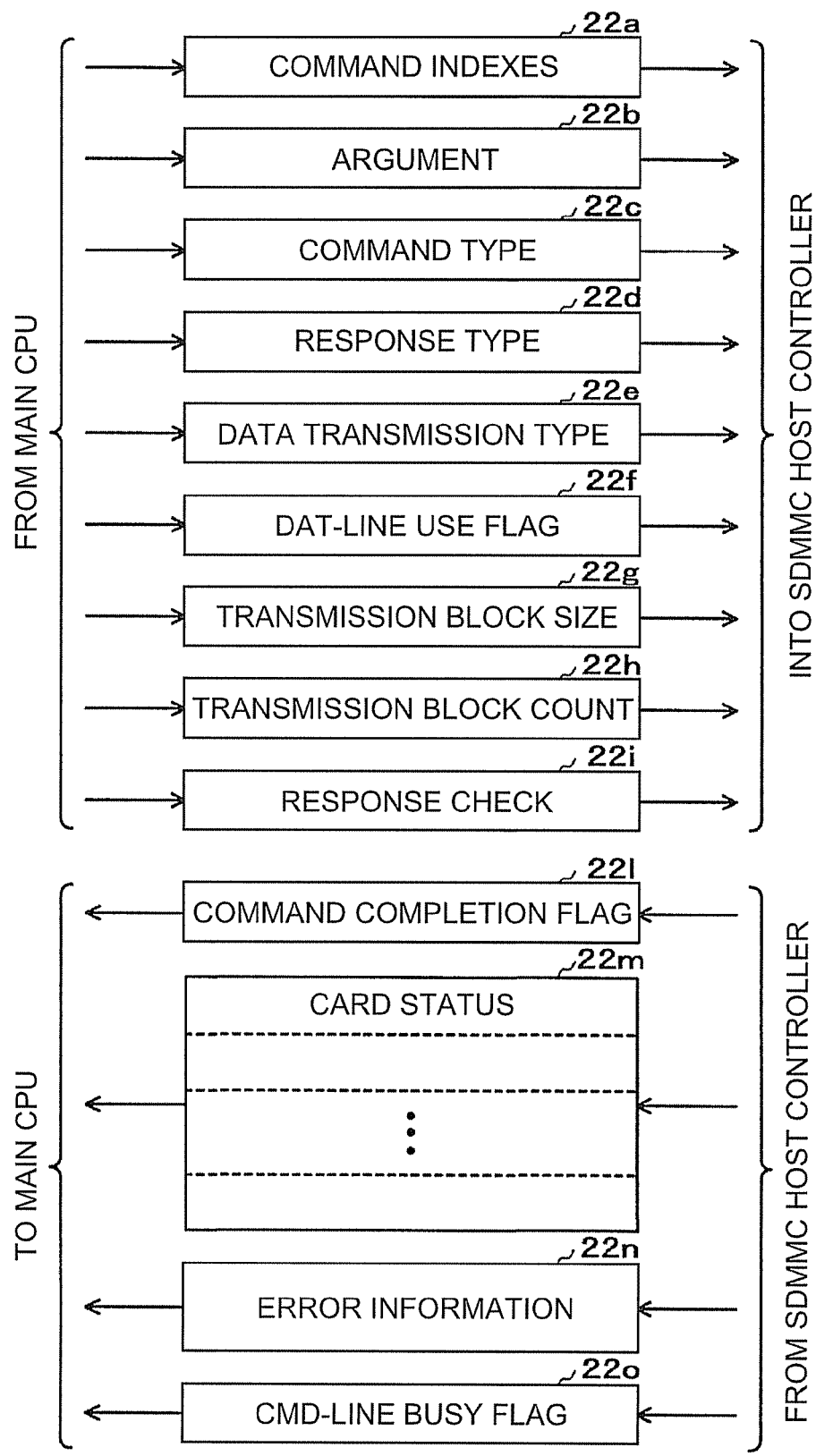
FIG. 4 is a diagram showing an internal register map of a register control section shown in FIG. 3.

FIG. 4 is a diagram showing an example of a register map in the register control section 22. Registers 22a to 22i among the registers shown in FIG. 4 are written by the main CPU 2 and are read by the internal circuit of the SDMMC host controller 10. Additionally, registers 22l to 22o are written by the internal circuit of the SDMMC host controller 10 and are read by the main CPU 2.

The register 22a is used to write a command index of a command to be issued (broadly, command specifying information or instruction information) therein, and the register 22b is used to write an argument of the command to be issued (broadly, instruction information).

The register 22c is a register used to write a type of the command to be issued, such as normal, suspend, resume, or abort, (broadly, instruction information). The register 22d is a register used to write a type of a response to the issued command (no response, a 136-bit response (equivalent to the response type "R2"), a 48-bit response (equivalent to the response type "R1", "R3" or the like.), and RespBusy (equivalent to the response type "R1b" or the like) (broadly, instruction information).

The registers 22e to 22h are used when a command to be issued involves data transmission. The register 22e is a register used to write a data-transmission type (single, infinite, multiple, stream, or the like) (broadly, instruction information). The register 22f is a register used to write a flag indicating that the DAT line is used for data transmission (hereinafter referred to as a "DAT-line use flag") (broadly, instruction information). The register 22g is used to write a transmission block size (broadly, instruction information), and the register 22h is used to write a transmission block count (broadly, instruction information).

The register 22i is a register used to write data that designates whether checking should be performed on any one or all of errors excluding card status errors, such as an index error, an end-bit error, a CRC error, and a timeout error, which are hereinafter referred to as "transmission errors" (broadly, instruction information).

The register 22l is a register used to write a flag that indicates command completion (hereinafter referred to as a "command completion flag").

The register 22m is a register used to write a card status of a response (broadly, response content information). As described above, a card status length of the response varies with the type of the response, namely, the command. For example, when the response type is "R1" (48 bits), the card status of the response is 32 bits in length. When the response type is "R2" (136 bits), the card status of the response is 120 bits in length. Thus, for example, the register 22m may be maintained so as to have a longer bit length (e.g. approximately 128 bits) to write the card status of the response in a predetermined position among the long bits.

The register 22n is a register used to write data that indicates the checking result of a designated error when the data designating the transmission error checking is written in the register 22i. The data indicating the checking result of the designated error may be set to bits at positions in accordance with the kind of the transmission error. Additionally, the kind of the transmission error may be coded. When the transmission error checking is designated, the main CPU 2 reads the register 22n to acquire information as to whether any transmission error has occurred or not.

The register 22o is a register used to write a flag indicating whether the CMD line is now in use or not (hereinafter referred to as a "CMD-line busy flag"). The CMD-line busy flag is set when the SDMMC host controller 10 starts to issue a command, and the busy flag is cleared when the host controller completes response reception. The main CPU 2 reads the register 22o to determine whether any command is now being executed, namely, whether issuing of a next command can be instructed or not.

The register map shown in FIG. 4 is among many examples, and various modified examples can be considered. For example, all the registers may be 32-bit wide, and then a plurality of data having a bit length smaller than 32 bits may be combined and stored in a single register. Additionally, for example, a register may be provided to store a flag that allows the clock output section 21 to output or stop the clock signal SDCLK, whereby the main CPU 2 can allow the clock output section 21 to output or stop the clock signal SDCLK. Furthermore, for example, a register may be provided to store data that designates whether an interrupt signal should be output to the main CPU 2 when a card status error or a transmission error occurred, so as allow the interrupt signal to be output to the main CPU 2 when such an error occurred.

Again, referring back to FIG. 3, the SDMMC control section 23 includes a command/response transmission and reception section 23a and a data transmission and reception section 23b.

The command/response transmission and reception section 23a issues a command to the card based on information written in the registers 22a to 22i by the main CPU 2 and receives a response to the command from the card to write response-based information into the registers 22l to 22o.

In the present embodiment, the command/response transmission and reception section 23a separately has a signal line CMD_out used to issue a command and a signal line CMD_in used to receive a response. When a command is issued, the command/response transmission and reception section 23a supplies the command on the signal line CMD_out, and then the card interface 13 outputs the command to the CMD line between the card interface 13 and the card. Upon reception of a response to the command, the card interface 13 outputs the response supplied on the CMD line therebetween to the signal line CMD_in.

The data transmission and reception section 23b operates when a command indicated by the index written in the register 22a involves data transmission, and does not operate when the command indicated by the index written therein involves no data transmission.

When the command specified by the command index written in the register 22a involves data write into the card, the command/response transmission and reception section 23a issues the command to the card. Then, after completion of receiving a response to the command, the command/response transmission and reception section 23a instructs the data transmission and reception section 23b to start data write into the card. Additionally, when the command specified by the index written in the register 22a involves data read from the card, the command/response transmission and reception section 23a issues the command to the card, and after reception of a response to the command, the section 23a instructs the section 23b to start data read from the card.

The DMA control section 24 operates when the command specified by the command index written in the register 22a involves data transmission, and does not operate when the command specified by the index written therein involve no data transmission.

In order to instruct execution of the command involving data write into the card, the main CPU 2, first, writes data to be written into the card in the DMA transfer area of the RAM 4 (See FIG. 2), and then writes the index or the like of the command into the registers 22a to 22h. In response to that, the command/response transmission and reception section 23a in the SDMMC control section 23 of the SDMMC host controller 10 issues the command to the card. After completing the reception of the response to the command, the section 23 instructs the data transmission and reception section 23b to start data write into the card. The section 23b receives the instruction from the section 23a to instruct the DMA control section 24 to perform the DMA transfer of data in the DMA transfer area of the RAM 4. The DMA control section 24 has a First-In First-Out (FIFO) buffer 24a and receives the instruction from the section 23b to sequentially DMA-transfer the data in the DMA transfer area thereof to the FIFO buffer 24a. Then, the section 23b sequentially reads the data transferred in the FIFO buffer 24a to sequentially write the data into the card via the card interface 13.

Meanwhile, when instructing execution of the command involving data read from the card, the main CPU 2 writes the index or the like of the command into the registers 22a to 22h. In response to that, the command/response transmission and reception section 23a issues the command to the card. Then, after receiving the response to the command, the section 23a instructs the data transmission and reception section 23b to start data read from the card. The section 23b receives the instruction from the section 23a and then sequentially reads the data from the card via the card interface 13 to sequentially write the data into the FIFO buffer 24a, as well as instructs the DMA control section 24 to perform the DMA transfer of the data in the FIFO buffer 24a. The DMA control section 24 receives the instruction from the section 23b to sequentially DMA-transfer the data in the buffer to the DMA transfer area of the RAM 4.

In the present embodiment, the data transmission and reception section 23b separately has an 8-bit wide signal line DAT_out [7:0] used to output the data to be written into the card and a signal line DAT_in [7:0] used to read the data from the card. Then, when writing data into the card, the data transmission and reception section 23b supplies the data on the signal line DAT_out [7:0], and then, the card interface 13 outputs the data to the 1, 4, or 8-bit wide DAT line between the card interface 13 and the card. When reading the data from the card, the card interface 13 outputs the data supplied on the DAT line therebetween to the signal line DAT_in [7:0]. When the bit width of the DAT terminal of the card is not 8 bits, the card interface 13 changes the bit width of the data according to needs.

Next, a description will be given of the response check bit table and the lookup table in the table storage area of the RAM 4 (See FIG. 2).

FIG. 5 is a diagram showing a response check bit table CheckBit [k] ($0 \leq k \leq 49$). FIGS. 6 to 7 are diagrams showing a lookup table Lookup [m] [n] ($0 \leq m \leq 6$, $0 \leq n \leq 63$).

As described above, the positions of error bits in the card status of the response are not the same in all commands. However, the inventor of the invention obtained the following findings.

First, the inventor found out that since an error occurrence ratio is smaller than a non-error occurrence ratio in the card upon execution of a command, it is more favorable in terms of processing rate to first determine whether any error occurred rather than what error occurred. Then, the inventor found out that, after determining the occurrence of any error, it is favorable in terms of the processing rate to determine the content of the error occurred if needed.

Secondly, the inventor found out that although an error bit position in the card status of a response is not the same among all commands, there are some commands having the same error bit position in the card status thereof.

For example, in the card C6 of the sixth format, when a most significant bit (MSB) of the card status is a 31st bit and a least significant bit (LSB) thereof is a 0th bit, the error bit position in the card status of a response to a command "CMD 7" (a command index "7" (0x07)) includes a total of 11 bits consisting of a 27th bit, a 26th bit and 24th to 16th bits. In other words, in the card C6 of the sixth format, upon the execution of the command "CMD7", the presence or absence of any error in the card can be determined by whether at least one of the 11 bits is "1". Additionally, whether the at least one of the 27th bit, the 26th bit, the 24th to the 16th bits in the card status of the response to the command "CMD 7" in the card C6 of the sixth format is set to "1" or not can be easily and rapidly determined as will be described below. Specifically, the foregoing determination can be easily and rapidly made by whether logical product (AND) calculation (broadly, calculation processing) of the card status (32 bits) of the response to the command "CMD 7" in the card C6 of the sixth format and a check pattern (a bit pattern) "0x0DFF0000" (32 bits) results in "0" (0x0000) or not.

Error bit positions in the card status of a response to a command "CMD 26" (a command index "26" (0x1A) are the same as in the card status of the response to the command "CMD 7" in the card C6 of the sixth format described above. In other words, in the card C6 of the sixth format, the presence or absence of any error in the card upon the execution of the command "CMD 26" can be easily and rapidly determined by whether logical product calculation of the card status (32 bits) of the response to the command "CMD 26" in the card C6 of the sixth format and the check pattern "0x0DFF0000" (the same as in the card status of the response to the command "CMD 7" in the card C6 of the sixth format described above) results in "0" (0x0000).

In the card C5 of the fifth format, error bit positions in the card status of a response to the command "CMD 7" (the command index "7" (0x07) are also the same as those in the card status of the response to the command "CMD 7" in the card C6 of the sixth format described above. In other words, in the card C5 of the fifth format, the presence or absence of any error in the card upon the execution of the command "CMD 7" can be easily and rapidly determined by whether logical product calculation of the card status (32 bits) of the response to the command "CMD 7" in the card C5 of the fifth format and the check pattern "0x0DFF0000" (the same as in the card status of the response to the command "CMD 7" in the card C6 of the sixth format described above) results in "0" (0x0000).

Additionally, in the card C6 of the sixth format, a plurality of extended commands "ACMD" are provided that are issued following a command "CMD 55" (a command index "55" (0x37)). Error bit positions in the card status of a response to an extended command "ACMD 13" (a command index "13" (0x0D) as one of the extended commands are also the same as in the card status of the response to the command "CMD 7" (the command index "7" (0x07)) in the card C6 of the sixth format. In other words, in the card C6 of the sixth format, the presence or absence of any error occurred in the card upon the execution of the extended command "ACMD 13" can be easily and rapidly determined by whether logical product calculation of the card status (32 bits) to the extended command "ACMD 13" in the card C6 of the sixth format and the check pattern "0x0DFF0000" (the same as in the card status of the response to the command "CMD 7" in the card C6 of the sixth format described above) results in "0" (0x0000).

The inventor checked error bit positions in the card statuses of responses to all commands in the cards C1 to C6 of the first to the sixth formats and found out that when 50 check patterns shown in FIG. 5 are prepared, whenever any command may be executed in the card of any format, the presence or absence of any error can be easily and rapidly determined by calculating logical products of the card statuses of the responses and the check patterns.

Accordingly, in the present embodiment, the table storage area of the RAM 4 (See FIG. 2) includes the response check bit table (broadly, an error determination information table) including the 50 check patterns (broadly, error determination information) shown in FIG. 5. Thereby, whenever any command may be executed in the card of any format, it can be easily and rapidly determined whether any error occurred or not in the card. In this manner, determination processing can be simplified and the amount of codes can be reduced, thereby improving program readability, thus improving processing rate.

Additionally, in the present embodiment, the table storage area of the RAM 4 further includes the lookup table (broadly, an error determination information specifying information table) shown in FIGS. 6 to 7. Thereby, it can be rapidly determined which check pattern among the 50 ones in the response check bit table of FIG. 5 should be used upon execution of a command in the card of a predetermined format. As a result, processing rate can be further improved.

For example, when the above card is of the sixth format and the command issued to the card is the command "CMD 7", the main CPU 2 (See FIG. 2) refers to a sixth column (an element number "0d5" in a columnar direction) and an eighth row (an element number "0d07" in a row direction) of the lookup table in the table storage area of the RAM 4 (See FIG. 2) to acquire a lookup value (broadly, error determination information specifying information) "0d41". Then, based on the lookup value "0d41", the main CPU 2 refers to a 42nd row (an element number "0d41" in the row direction) of the response check bit table and thereby can rapidly acquire the check pattern "0x0DFF0000".

When the card is of the sixth format and the command issued to the card is the command "CMD 26", the main CPU 2 refers to the sixth column (the element number "0d5" in the columnar direction) and a 27th row (an element number "0d26" in the row direction) of the lookup table in the table storage area of the RAM 4 to acquire the lookup value "0d41". Then, based on the lookup value "0d41", the main CPU 2 refers to the 42nd row (the element number "0d41" in the row direction) of the response check bit table in the table storage area of the RAM 4 and thereby can rapidly acquire the check pattern "0x0DFF0000".

When the card is of the fifth format and the command issued to the card is the command "CMD 7", the main CPU 2 refers to a fifth column (an element number "0d4" in the columnar direction) and the eighth row (the element number "0d07" in the row direction) of the lookup table in the table storage area of the RAM 4 to acquire the lookup value "0d41". Then, based on the lookup value "0d41", the main CPU 2 refers to the 42nd row (the element number "0d41" in the row direction) of the response check bit table in the table storage area of the RAM 4 and thereby can rapidly acquire the check pattern "0x0DFF0000".

Additionally, when the card is of the sixth format and the command issued to the card is the extended command "ACMD 13", the main CPU 2 refers to a seventh column (an element number "0d6" in the columnar direction) and a 14th row (an element number "0d13" in the row direction) of the lookup table in the table storage area of the RAM 4 to acquire the lookup value "0d41". Then, based on the lookup value "0d41", the main CPU 2 refers to the 42nd row (the element number "0d41" in the row direction) of the response check bit table in the table storage area of the RAM 4 and thereby can rapidly acquire the check pattern "0x0DFF0000".

Due to the 32-bit card status, preferably, each table element (each check pattern) of the response check bit table is set to 32 bits. Additionally, since the response check bit table includes the 50 elements, each table element (each lookup value) of the lookup table needs only 6 bits as a possible minimum size. However, 1 byte (8 bits) is preferable in terms of facilitating data processing.

Furthermore, either one or both of the response check bit table and the lookup table may be included in the ROM 3 (which may be a writable ROM such as a flash memory). Alternatively, either one or both of the tables may be once formed in the ROM 3, and then the main CPU 2, the DMA controller (not shown) or the like may transfer the table into the RAM 4.

Furthermore, using the communication circuit 7, the response check bit table and/or the lookup table may be referred to or a part or all of the tables may be updated according to needs. Thereby, the electronic apparatus 1 of the embodiment is flexibly adaptable to an addition or a change in the format of a card or a device such as an SDIO device or a CE-ATA device, an addition or a change in a command, debug of those tables, and the like. When a format or a command is added, it is only necessary to increase the number of elements in the tables.

For example, in the card C6 of the sixth format, it assumes that the content of a presently reserved command "CMD 1" (a command index "1" (0x01)) is newly added in the specification. If a check pattern used to determine whether any error occurred in the card upon execution of the command is not coincident with any of the 50 check patterns in the response check bit table of FIG. 5, a new check pattern for determining the presence or absence of any error in the card C6 of the sixth format upon the execution of the command may be added as a 51st table element in the response check bit table. Additionally, when such a table element is added via the communication circuit 7, the electronic apparatus 1 is flexibly adaptable to upgrading of card specification, and the like.

In order to add a format of a card or device, such as SDIO and CE-ATA devices, the number of columns of the lookup table may be increased, as well as a new table element may be added in the response check bit table if needed.

Additionally, connecting the communication circuit 7 to the Internet enables the tables to be updated via the Internet.

Furthermore, connecting the communication circuit 7 to a debugger can facilitate debugging of the tables.

3. Operation

Next will be described operation of the electronic apparatus 1 of the embodiment.

Figure 8:
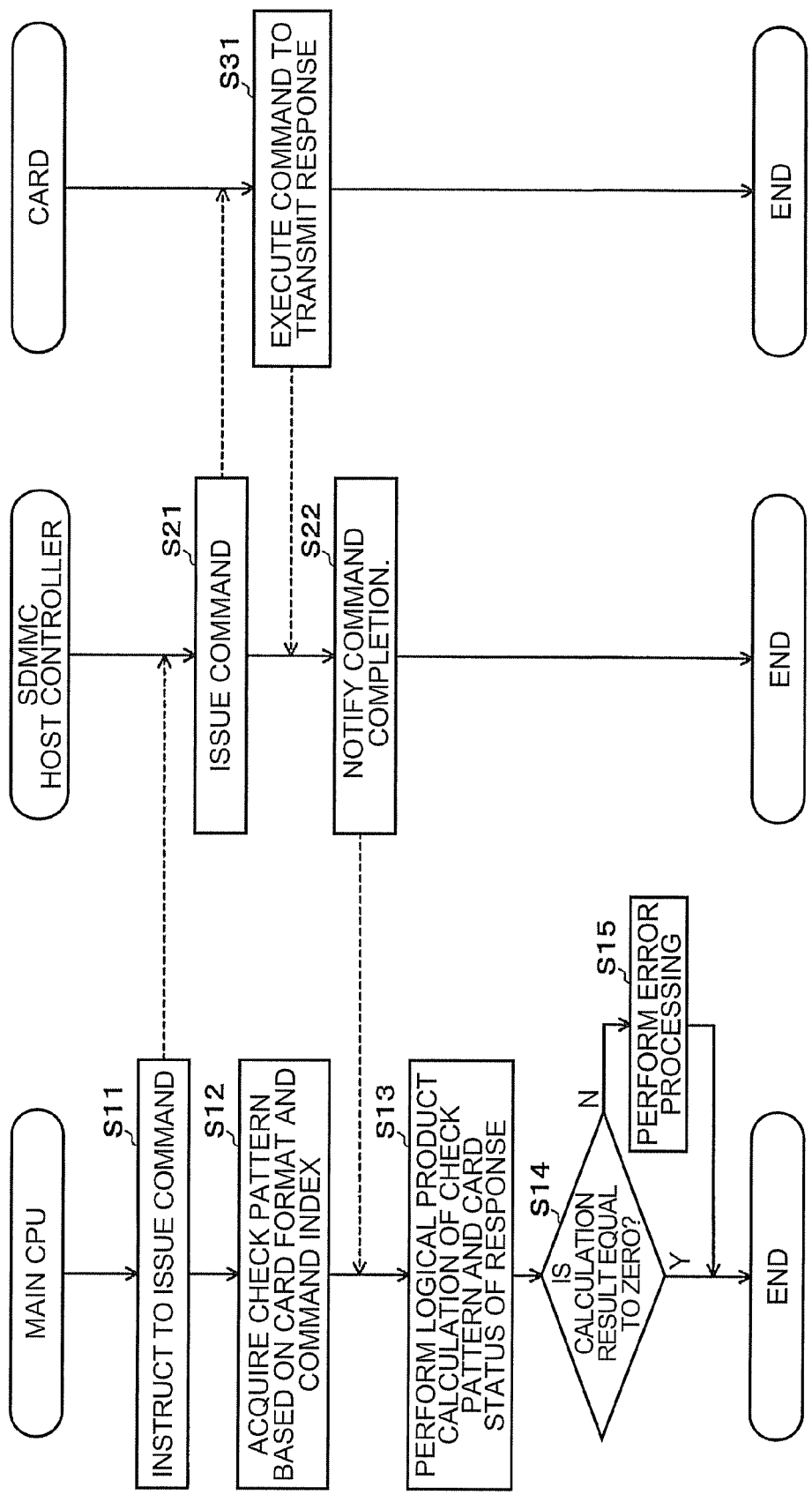
FIG. 8 is a flowchart showing an operation example according to the embodiment.

FIG. 8 is a flowchart showing an operation according to the embodiment when a command is issued to a card. In this case, the card C6 of the sixth format is installed in the card slot 6 to issue the command "CMD 7" (the command index "7" (0x07)) to the card C6.

First, the main CPU 2 executes a driver program in the ROM 3 to write the command index ("7" (0x07)), an argument, a command type, a response type, a data transmission type, a DAT-line use flag, a transmission block size, a transmission block count, and a response check into the registers 22*a* to 22*i* to instruct the SDMMC host controller 10 to issue a command (Step S11).

When the command to be issued involves data write into the card C6, the main CPU 2 prepares data to be written into the card C6 in the DMA transfer area of the RAM 4 before instructing the issue of the command.

The command/response transmission and reception section 23*a* of the SDMMC control section 23 issues the command to the card C6 according to a signal and data from the register control section 22 (Step S21). Specifically, the section 23*a* sets the start bit to "0" and the transmitter bit to "1". Next, based on the total 40 bits consisting of the start bit, the transmitter bit, the command index stored in the register 22*a* (6 bits, namely, "7" (0x07")), and the argument (32 bits) stored in the register 22, the section 23*a* calculates the CRC (7 bits). Then, the section 23*a* transmits the command with the total of 48 bits obtained by combining the start bit ("0"), the transmitter bit ("1"), the command index (6 bits), the argument (32 bits), the CRC (7 bits), and the end bit ("1") to the card C6 via the card interface 13.

The card C6 executes the received command (the command "CMD 7") to transmit a response (the type "R1" (48 bits)) to the command/response transmission and reception section 23*a* (Step S31).

The command/response transmission and reception section 23*a* receives the response R1 (48 bits) from the card C6 via the card interface 13 to write the card status (32 bits) of the received response into the register 22*m*, as well as sets a command completion flag to the register 22*l* to notify the completion of the command to the main CPU 2 (Step S22). In this situation, the register control section 22 may output an interrupt signal notifying the completion of the command to the main CPU 2. Additionally, if any transmission error occurs, the section 23*a* writes error information regarding the transmission error into the register 22*n*.

When the command issued to the card C6 involves data write into the card C6, the command/response transmission and reception section 23*a* instructs the data transmission and reception section 23*b* to start data write into the card C6 upon reception of the response from the card C6. Additionally, when the normal command issued to the card C6 involves data read from the card C6, the section 23*a* instructs the section 23*b* to start data read from the card C6 upon the reception of the response from the card C6.

Meanwhile, at step S11, the main CPU 2 instructs the SDMMC host controller 10 to issue the command to acquire a check pattern based on the format of the card (the sixth format) and the command index ("7": 0x07) (Step S12). Specifically, the main CPU 2 refers to the sixth column (the element number "0d5" in the columnar direction) and the eighth row (the element number "0d07" in the row direction) of the lookup table to acquire a lookup value 0d41. Then, based on the lookup value "0d41", the main CPU 2 refers to the 42nd row (the element number "0d41" in the row direction) of the response check bit table and thereby can rapidly acquire the check pattern "0x0DFF0000".

The check-pattern acquiring processing as above may be simply described with a small number of codes, for example, in the C language, such as CheckBit [Lookup [CMD index] [Ver]].

In the above codes, the "CheckBit" represents a table name of the response check bit table (See FIG. 5); the "Lookup" represents a table name of the lookup table (See FIGS. 6 to 7); the "ver" represents a variable indicating the columnar element number indicating the format of the card (broadly, format specifying information, "0d5" in the above case); and the "CMD index" represents a variable indicating the row element number ("0x07" in the above case) equal to the command index. If the variable "ver" ranges from 0 to 5, according to the format of a card, the variable "ver" can be determined at an initial time. If the variable "ver" is 6, the valuable "ver" can be determined when it is shown that a card installed in the card slot 6 is the card C6 of the sixth format and a command to be issued to the card C6 of the sixth format is the extended command "ACMD".

The main CPU 2 receives a command completion notice from the SDMMC host controller 10 and then reads the card status stored in the register 22m of the register control section 22 to calculate a logical product (broadly, calculating processing) of the card status and the check pattern ("0x0DFF0000" in the case) acquired at step S12.

As described above, if no error is present in the card C6 that has executed the command "CMD 7", the logical product calculation between the card status and the check pattern results in "0" (0x00000000), whereas if there is any error in the card C6 that has executed the command, the result of the logical product calculation therebetween is other than "0".

The main CPU 2 terminates the processing (step S14) when the above calculation result is "0".

Conversely, when the calculation result is not "0" at step S14, the main CPU 2 executes error processing (step S15). For example, the error processing may include processing that specifies error content, such as what error is present in the card C6 that executed the command "CMD 7". In that case, it is only necessary to sequentially check the total of 11 bits consisting of the 27th bit, the 26th bit, and the 24th to the 16th bits.

The processing of conditional branch as in step S14 can be written in assembler language, for example, with a small number of codes such as:

AND r1, r2
BNZ $error_routine

In the above language, the "AND" represents a logical product calculation command that is widely and generally provided in CPUs. The "r1" represents an internal register of the main CPU 2 storing the card status read from the register 22m (See FIG. 4) in the register control section 22 (See FIG. 3), and the "r2" represents an internal register of the main CPU 2 storing the check pattern acquired at step S12. Additionally, the "BNZ" represents a conditional branch command that is widely and generally provided in CPUs and used to branch when a zero flag (generally set or cleared by the result of an immediately-preceding command ("AND" in the present example) is not set in the CPU. Furthermore, the "$error_routine" represents a label indicating a leading address of the error processing (Step S15).

As described above, in the present embodiment, the error determination information associated with the combination of the format specifying information and the command specifying information can be acquired, and based on the error determination information and the response content information, the presence or absence of any error in a response can be easily determined. As a result, processing can be simplified and the amount of codes can be reduced, so that program readability can be improved, thus improving processing rate.

Additionally, in the present embodiment, processing an error-related portion in the response content information can ensure determination of the presence or absence of any error.

Additionally, in the present embodiment, also, the error determination processing can be easily made in devices of a plurality of kinds, specifications, standards, and/or versions. Thus, the embodiment is widely adaptable for use in various related applications.

Additionally, in the present embodiment, the error determination information specifying information table including a plurality of pieces of error determination information specifying information for specifying a plurality of pieces of error determination information is used in association with the combination of a plurality of pieces of format specifying information and a plurality of pieces of command specifying information, Thereby, the error determination information associated with the combination of the format specifying information and the command specifying information can be rapidly and easily acquired, so that processing rate can be improved.

Additionally, in the present embodiment, first, the presence or absence of any error can be determined and then if there is any error, the content of the error can be specified. Accordingly, if there is no error, unnecessary processing can be skipped, thus improving processing rate.

Additionally, in the present embodiment, the simple calculation processing can determine the presence or absence of any error, with the number of codes reduced. As a result, program readability can be improved, thus improving processing rate.

4. First Modification

Next, a description will be given of a first modification of the embodiment.

Based on a value of the SPEC_VERS field in the CSD register in each card, the MMC cards can be classified into five groups of versions: (1) Vers. 1.0 to 1.2; (2) Ver. 1.4; (3) Vers. 2.0 to 2.2; (4) Vers. 3.0 to 3.31; and (5) Vers. 4.0 to 4.2. In each card of those versions, a maximum of 64 kinds of commands can be issued.

Additionally, based on the value of the SPEC_VERS field of the CSD register in each card, the SD cards can be classified into three version groups: (6) Ver. 1.01; (7) Ver. 1.10; and (8) Ver. 2.00. In each SD card of the above versions, similarly, a maximum of 64 kinds of commands "CMD" can be issued. Furthermore, in the SD cards of the three versions, the extended command "ACMD" can be issued.

Thus, instead of the response check bit table of FIG. 5 and the lookup table of FIGS. 6 to 7, a response check bit table shown in each of FIGS. 9 to 17 may be stored in the table storage area of the RAM 4.

FIG. 9 is a diagram showing a response check bit table CheckBit 1 [k] ($0 \leq k \leq 63$) used when a card installed in the card slot 6 is of the above version group (1) (a card 1). The response check bit table stores 64 check patterns (each 4 bytes) in association with the maximum of 64 kinds of commands ("CMD 0" to "CMD 63"), which can be issued to the card 1. When the card 1 is installed in the card slot 6, the main CPU 2 reads a check pattern from the response check bit table based on the command index of a command, which the card controller 5 is instructed to issue. The response check bit table is 256 bytes: 64 (the number of the kinds of the commands)×4 bytes).

FIG. 10 is a diagram showing a response check bit table CheckBit 2 [k] (0≦k≦63) used when a card installed in the card slot 6 is of the above version group (2) (a card 2). The response check bit table stores 64 check patterns (each 4 bytes) in association with the maximum of 64 kinds of the commands ("CMD 0" to "CMD 63"), which can be issued to the card 2. When the card 2 is installed in the card slot 6, the main CPU 2 reads a check pattern from the response check bit table based on the command index of a command, which the card controller 5 is instructed to issue. The response check bit table is 256 bytes (64×4 bytes) as above.

FIG. 11 is a diagram showing a response check bit table CheckBit 3 [k] (0≦k≦63) used when a card installed in the card slot 6 is of the above version group (3) (a card 3). The response check bit table stores 64 check patterns (each 4 bytes) in association with the maximum of 64 kinds of the commands ("CMD 0" to "CMD 63"), which can be issued to the card 3. When the card 3 is installed in the card slot 6, the main CPU 2 reads a check pattern from the response check bit table based on the command index of a command, which the card controller 5 is instructed to issue. The response check bit table is 256 bytes (64×4 bytes) as above.

FIG. 12 is a diagram showing a response check bit table CheckBit 4 [k] (0≦k≦63) used when a card installed in the card slot 6 is of the above version group (4) (a card 4). The response check bit table stores 64 check patterns (each 4 bytes) in association with the maximum of 64 kinds of the commands ("CMD 0" to "CMD 63"), which can be issued to the card 4. When the card 4 is installed in the card slot 6, the main CPU 2 reads a check pattern from the response check bit table based on the command index of a command, which the card controller 5 is instructed to issue. The response check bit table is 256 bytes (64×4 bytes) as above.

FIG. 13 is a diagram showing a response check bit table CheckBit 5 [k] (0≦k≦63) used when a card installed in the card slot 6 is of the above version group (5) (a card 5). The response check bit table stores 64 check patterns (each 4 bytes) in association with the maximum of 64 kinds of the commands ("CMD 0" to "CMD 63"), which can be issued to the card 5. When the card 5 is installed in the card slot 6, the main CPU 2 reads a check pattern from the response check bit table based on the command index of a command, which the card controller 5 is instructed to issue. The response check bit table is 256 bytes (64×4 bytes).

FIG. 14 is a diagram showing a response check bit table CheckBit 6 [k] (0≦k≦63) used when a card installed in the card slot 6 is of the above version group (6) (a card 6). The response check bit table stores 64 check patterns (each 4 bytes) in association with the maximum of 64 kinds of the commands ("CMD 0" to "CMD 63"), which can be issued to the card 6. When the card 6 is installed in the card slot 6, the main CPU 2 reads a check pattern from the response check bit table based on the command index of a command, which the card controller 5 is instructed to issue. The response check bit table is 256 bytes (64×4 bytes) as above.

FIG. 15 is a diagram showing a response check bit table CheckBit 7 [k] (0≦k≦63) used when a card installed in the card slot 6 is of the above version group (7) (a card 7). The response check bit table stores 64 check patterns (each 4 bytes) in association with the maximum of 64 kinds of the commands ("CMD 0" to "CMD 63") which can be issued to the card 7. When the card 7 is installed in the card slot 6, the main CPU 2 reads a check pattern from the response check bit table based on the command index of a command, which the card controller 5 is instructed to issue. The response check bit table is 256 bytes (64×4 bytes) as above.

FIG. 16 is a diagram showing a response check bit table CheckBit 8 [k] (0≦k≦63) used when a card installed in the card slot 6 is of the above version group (8) (a card 8). The response check bit table stores 64 check patterns (each 4 bytes) in association with the maximum of 64 kinds of the commands ("CMD 0" to "CMD 63"), which can be issued to the card 8. When the card 8 is installed in the card slot 6, the main CPU 2 reads a check pattern from the response check bit table based on the command index of a command, which the card controller 5 is instructed to issue. The response check bit table is 256 bytes (64×4 bytes) as above.

FIG. 17 is a diagram showing a response check bit table CheckBit 9 [k] (0≦k≦1) used when a card installed in the card slot 6 is any one of the cards 6 to 8 and the extended command "ACMD" is issued to the any one thereof. The extended command may include a maximum of 64 kinds. In the present case, error bit positions in the card statuses of responses to extended commands except for an extend command "ACMD 6" are the same to one another. Accordingly, in the present case, it is only necessary to use two check patters: a check pattern (a first record (4 bytes) of the response check bit table shown in FIG. 17) of the card status of a response to the extended command "ACMD 6" and a check pattern (a second record (4 bytes) of the response check bit table shown in FIG. 17) of the card statuses of the responses to the extended commands except for the extend command "ACMD 6". When the card 8 is installed in the card slot 6 and the extended command, which the card controller 5 is instructed to issue, has the command index "6", the main CPU 2 reads the first record of the response check bit table as the check pattern. Meanwhile, when the command index of the above extended command is not "6", the main CPU 2 reads the second record of the response check bit table as the check pattern. The response check bit table is 8 bytes in size.

The response check bit tables CheckBit 1 to 9 shown in FIGS. 9 to 17 may be combined into a single table.

A total size of the eight response check bit tables CheckBit 1 to 8 is 2048 bytes (256 bytes×8). The response check bit table CheckBit 9 of FIG. 17 is 8 bytes. Consequently, the total size of the nine response check bit tables CheckBit 1 to 9 in FIGS. 9 to 17 is 2056 bytes (2048 bytes+8 bytes).

Meanwhile, the response check bit table CheckBit of FIG. 5 described above is 200 bytes (50 rows×4 bytes). The lookup table Lookup of FIGS. 6 to 7 is 448 bytes (64 rows×7 columns×1 byte per lookup value). Thus, a total size of the response check bit table CheckBit of FIG. 5 and the lookup table Lookup of FIGS. 6 to 7 is 648 bytes (200 bytes+448 bytes).

As shown above, the total size of the response check bit table of FIG. 5 and the lookup table of FIGS. 6 to 7 is smaller than that of the response check bit tables 1 to 9 of FIGS. 9 to 17. Thus, when it is necessary to reduce a capacity of the table storage area of the RAM 4, the table of FIG. 5 and the lookup table of FIGS. 6 to 7 may be used.

Meanwhile, when using the response checkbit table of FIG. 5 and the lookup table of FIGS. 6 to 7, first, a lookup value is needed to acquire from the lookup table so as to acquire a bit pattern from the response check bit table based on the lookup value. In short, it is necessary to refer to the tables twice. Thus, in order to reduce a table reference count so as to reduce time for acquiring the bit pattern and the amount of codes, the response check bit tables CheckBit 1 to

9 of FIGS. 9 to 17 may be used instead of the table CheckBit of FIG. 5 and the table Lookup of FIGS. 6 to 7.

According to requirements of hardware or software in the electronic apparatus 1, it may be determined to use either the response check bit table of FIG. 5 and the lookup table of FIGS. 6 to 7 or the response check bit tables of FIGS. 9 to 17.

Additionally, the response check bit table CheckBit of FIG. 5, the lookup table Lookup of FIGS. 6 to 7, and the response check bit tables CheckBit 1 to 9 of FIGS. 9 to 17 may be once formed in the ROM 3. Then, at the initial time or the like, the main CPU 2, the DMA controller (not shown), or the like may transfer either the table of FIG. 5 and the lookup table of FIGS. 6 to 7 or the tables CheckBit 1 to 9 of FIGS. 1 to 9 into the RAM 4. Furthermore, the communication circuit 7 may be used to refer to the response check bit tables CheckBit 1 to 9 or update a part or all of the tables if needed.

The processing method of the present modification is different from the foregoing embodiment as follows: the embodiment acquires the lookup value from the lookup table based on the format specifying information and the command index and then acquires the check pattern from the response check bit table by using the acquired lookup value, whereas the present modification acquires the check pattern from the response check bit table based on the format specifying information and the command index. Other matters in the modification are the same as in the embodiment and thus descriptions thereof will be omitted.

As described hereinabove, in the present modification, the presence or absence of any error in a response can be determined with the small frequency of reference to the tables and with the small amounts of time and codes.

5. Second Modification

Next, a description will be given of a second modification of the embodiment.

When a command is issued to any one of the cards C1 to C6 of the first to the sixth formats and any error occurs during execution of the command in the card, an error bit representing the error is occasionally set not in the card status of a response to the command but in the card status of a response to a command issued following the command. The error bit that can cause such a situation vary with the format of the card. However, even in that case, the second modification can rapidly determine the presence or absence of any error.

In the second modification, the table storage area of the RAM 4 further stores an immediately-preceding command response check bit mask table Mask [m] (0≦m≦6) (broadly, an immediately-preceding command error determination information table) shown in FIG. 18, in addition to either the response check bit table CheckBit of FIG. 5 and the lookup table Lookup of FIGS. 6 to 7 or the response check bit tables CheckBit 1 to 9 of FIGS. 9 to 17.

For example, in the card C1 of the first format, when the MSB and the LSB, respectively, of the card status are the 31st bit and the 0 bit, error bits: the 30th bit, the 27th bit, the 26th bit, and the 21st to 17th bits result in the situation in which the error bits in the execution of a predetermined command are set in the card status of a response to a command following the predetermined command. The positions of those error bits can be represented by a bit pattern "0x4C3E0000" (broadly, immediately-preceding command error determination information: See a first column of the immediately-preceding command response check bit mask table Mask shown in FIG. 18).

Similarly, in the card C2 of the second format, when error bits are the 30th bit, the 27th bit, the 26th bit, the 24th bit, and the 21st to the 16th bits, the error bits in the execution of a predetermined command are set in the card status of a response to a next command, not to the predetermined command. The positions of those error bits can be represented by a bit pattern "0x4D3F0000" (broadly, immediately-preceding command error determination information: See a second column of the table Mask shown in FIG. 18).

Also in the card C3 of the third format, when error bits are the 30th bit, the 27th bit, the 26th bit, the 24th bit, and the 21st to the 16th bits, the error bits in the execution of a predetermined command are set in the card status of a response to a next command, not to the predetermined command. The positions of those error bits can be represented by the bit pattern "0x4D3F0000" (broadly, immediately-preceding command error determination information: See a third column of the mask table Mask shown in FIG. 18).

Additionally, in the card C4 of the fourth format, when error bits are the 31st bit, the 30th bit, the 27th bit, the 26th bit, the 24th bit, the 21st, the 19th to the 15th bits, and the 6th bit, the error bits in the execution of a predetermined command are set in the card status of a response to a next command, not to the predetermined command. The positions of those error bits can be represented by a bit pattern "0xCD2F8040" (broadly, immediately-preceding command error determination information: See a fourth column of the mask table Mask shown in FIG. 18).

Additionally, in the card C5 of the fifth format, when error bits are the 31st bit, the 27th bit, the 26th bit, the 24th bit, the 21st to the 19th bits, and the 16th bit, the error bits in the execution of a predetermined command are set in the card status of a response to a next command, not to the predetermined command. The positions of those error bits can be represented by a bit pattern "0x8D390000" (broadly, immediately-preceding command error determination information: See a fifth column of the mask table Mask shown in FIG. 18).

Additionally, in the card C6 of the sixth format, when error bits are the 31st to the 29th bits, the 27th bit, the 26th bit, the 24th bit, the 21st to the 19th bits, the 16th bit, and the 15 bit, the error bits in the execution of a predetermined normal command (CMD) are set in the card status of a response to a next command, not to the predetermined command. The positions of those bits can be represented by a bit pattern "0xED398000" (broadly, immediately-preceding command error determination information: See a sixth column of the mask table Mask shown in FIG. 18).

Similarly, in the card C6 of the sixth format, when error bits are the 31st to the 29th bits, the 27th bit, the 26th bit, the 24th bit, the 21st to the 19th bits, the 16th bit, and the 15 bit, the error bits in the execution of a predetermined extended command (ACMD) are set in the card status of a response to a next command, not to the predetermined command. The positions of those bits can be represented by the bit pattern "0xED398000" (broadly, immediately-preceding command error determination information: See a seventh column of the mask table Mask shown in FIG. 18).

In FIG. 18, the immediately-preceding command response check bit mask table Mask stores the above check patterns in association with the formats of the cards. The table Mask may be once formed in the ROM 3, and then, at the initial time or the like, the main CPU 2, the DMA controller (not shown), or the like may transfer the table Mask into the RAM 4. In addition, the table Mask may be referred to via the communication circuit 7. If needed, a part or entire part of the table Mask may be updated via the circuit.

Figure 19:
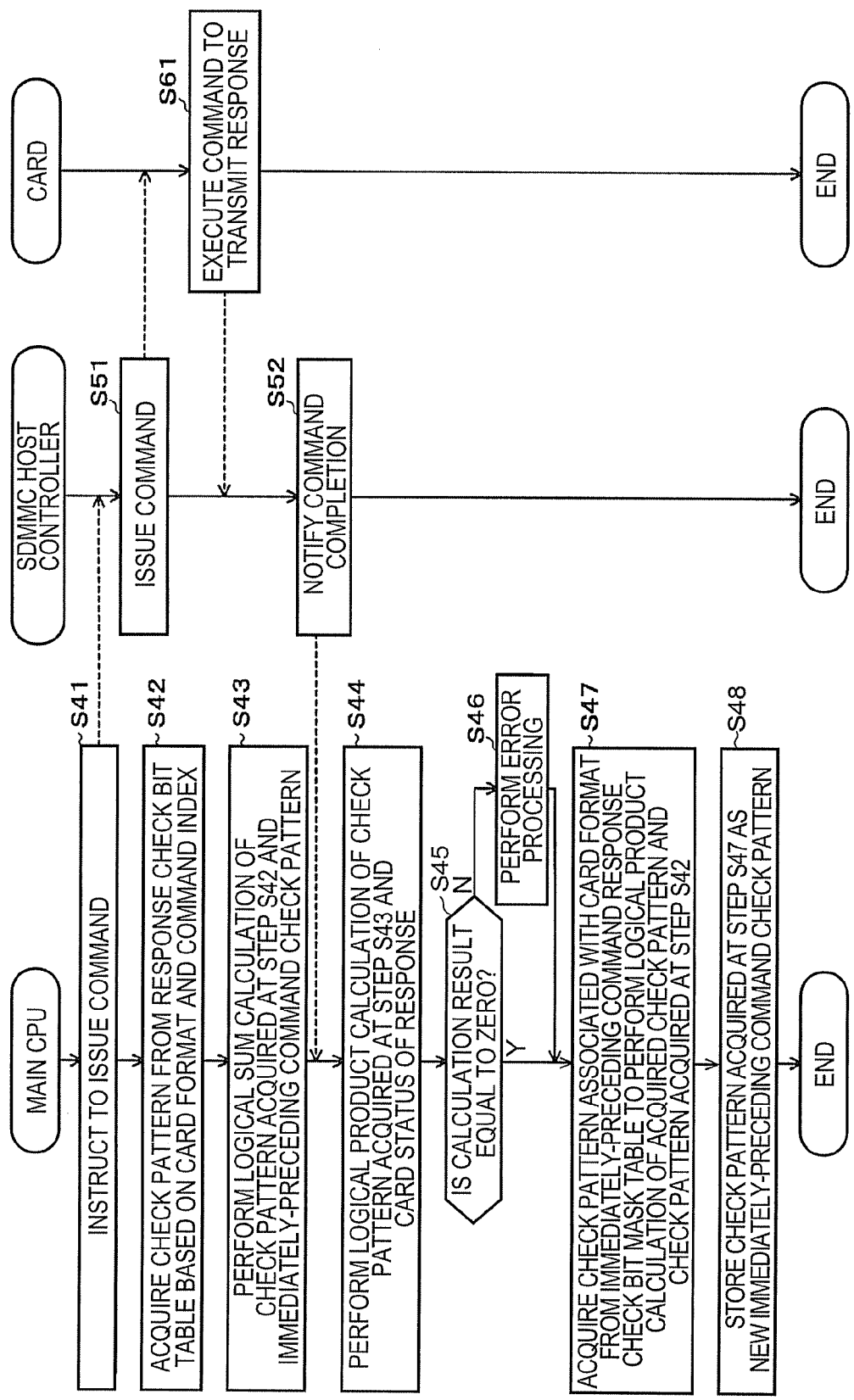
FIG. 19 is a flowchart showing an operation example according to a modification of the embodiment.

FIG. 19 is a flowchart showing operation of the second modification performed when a command is issued to one of the cards. In this case, the card C1 of the first format is installed in the card slot 6.

First, the main CPU 2 executes an internal driver program of the ROM 3 to write a command index, an argument, a command type, a response type, a data transmission type, a DAT-line busy flag, a transmission block size, a transmission block count, and a response check into the registers 22a to 22i so as to instruct the SDMMC host controller 10 to issue a command (hereinafter referred to as a "present command") (Step S41).

When the present command involves data write into the card C1, the main CPU 2 prepares data to be written into the card C1 in the DMA transfer area of the RAM 4 before the instruction of the issue of the present command.

The command/response transmission and reception section 23a in the SDMMC control section 23 issues the present command to the card C1 according to a signal and data from the register control section 22 (Step S51).

The card C1 executes the received present command to transmit a response (hereinafter referred to as a "present response") to the section 23a (Step S61).

The command/response transmission and reception section 23a receives the present response from the card C1 via the card interface 13 to write the card status of the received present response into the register 22m, as well as sets a command completion flag to the register 22l to notify the completion of the present command to the main CPU 2 (Step S52). In this case, the register control section 22 may output an interrupt signal for notifying the completion of the present command to the main CPU 2. In addition, when any transmission error is present, the section 23a writes error information regarding the transmission error into the register 22n.

When the present command issued to the card C1 involves data write into the card C1, the command/response transmission and reception section 23a instructs the data transmission and reception section 23b to start the data write into the card C1 upon the reception of the present response from the card C1. Furthermore, when the present command issued to the card C1 involves data read from the card C1, the section 23a instructs the section 23b to start the data read from the card C1 upon the reception of the present response from the card C1.

Meanwhile, at step S41, after instructing the SDMMC host controller 10 to issue the command, the main CPU 2 acquires a check pattern from the response check bit table CheckBit (See FIG. 5) based on the format of the card (the first format in the example) and a command index (Step S42).

As described above, in the card status of the present response, an immediately-preceding command error bit can be set other than a present-command error bit. Thus, the main CPU 2 calculates a logical sum of a check pattern that is acquired at step S42 and that represents a position of the present-command error bit and an immediately-preceding command check pattern (broadly, immediately-preceding command check information) that represents a position of the error bit in a response to a command issued by an instruction immediately before the present command, namely, an immediately-preceding command (Step S43). A check pattern obtained by the logical sum calculation represents both the present-command error bit and the immediately-preceding command error bit. The immediately-preceding command check pattern is updated at steps S47 to S48, which will be described in detail below, so as to use when issuing a next command. The immediately-preceding command check pattern may be stored in the working area of the RAM 4, any internal register of the main CPU 2, or the like. In addition, an initial value of the immediately-preceding command check pattern is set to "0x00000000", since no immediately-preceding command is present at the initial time. Additionally, the immediately-preceding command check pattern is cleared to zero upon a system reset or the like.

The main CPU 2 receives a command completion notice from the SDMMC host controller 10 and reads the card status stored in the register 22m of the register control section 22 to calculate a logical product of the card status and the check pattern acquired at step S43 (Step S44).

In the card C1 that has executed the immediately-preceding command and subsequently the present command, if no error is present, the logical product calculation of the card status and the check pattern acquired at step S43 results in "0" (0x00000000). On the other hand, if there is any error in the card C1 that has subsequently executed those commands, the result of the logical product calculation is other than "0".

Thus, if the calculation result is other than "0" (Step S45), the main CPU 2 performs error processing (Step S46). For example, the error processing may include a processing for specifying error content, such as what error occurred in the card C1 that executed the immediately-preceding command and the present command. The processing can be done by checking the error bit in the card status, for example.

Next, based on the format of the card (the first format in the present example) and a command index of the present command, the main CPU 2 updates and stores an immediately-preceding command check pattern for determining the presence or absence of a present-command error in a response to a command issued to the card C1 following the present command, namely, a next command (Steps S47 to S48).

Specifically, the main CPU 2 acquires the check pattern (0x4C3E0000) associated with the format of the card (the first format in the present example) from the immediately-preceding command response check bit mask table (See FIG. 18) to calculate a logical product of the check pattern and the check pattern that is acquired at step S42 and that represents the position of the present-command error bit (Step S47). Then, the main CPU 2 stores a logical product calculation result (a check pattern) obtained at step S47 as a new immediately-preceding command check pattern (Step S48). As described above, the immediately-preceding command check pattern may be stored in the working area of the RAM 4, the internal register of the main CPU 2, or the like. In addition, an initial value of the immediately-preceding command check pattern is set to "0x00000000", since no immediately-preceding command is present at the initial time. Furthermore, the immediately-preceding command check pattern is cleared to zero upon a system reset or the like.

As described hereinabove, in the second modification, even when the immediately-preceding command error bit is set in the present response, the presence or absence of any error can rapidly and easily determined.

In addition, embodiments of the invention are not restricted to those described above, and various modifications and changes are possible without departing from the scope of the gist of the invention. All blocks shown in FIGS. 2 to 4 are not necessarily needed and a part of the blocks may be omitted.

For example, the structures of the electronic apparatus and the host controller are not restricted to those shown in FIGS. 2 to 4 and the like. The structures of the apparatus and the controller can be variously modified and changed. In addition, the error determination method according to embodiments of the invention is not restricted to those in the embodiments described above and can be variously modified and changed.

Furthermore, in the descriptions of the specification and the drawings, the terms such as SDMMC host controller, SD card, and CPU are cited as representing broad terms such as the electronic apparatus, the host controller, the device, and the information processor. Those terms can be replaced with such broad terms in other descriptions of the specification and the drawings.

Furthermore, the embodiments according to the dependent claims appended hereinbelow may include a part of constituent elements of claims on which the dependent claims depend. Additionally, a main part of the embodiment according to any one of the independent claims may be made dependent on any other independent claim.

Still furthermore, embodiments of the invention can also be applied to error determination of cards compliant to specifications evolved from such MMC and SD cards, as well as to various kinds, specifications, standards, and/or versions based on the same concepts as in those cards.

What is claimed is:

1. An error determination program stored on a non-transitory computer readable medium and executed by an information processor included in an electronic apparatus that includes a device installation section capable of installing any one of a plurality of devices having different formats, a host controller acting as an intermediary between the information processor and the device installed in the device installation section, and a storage circuit storing an error determination information table that includes a plurality of pieces of error determination information for determining a presence or absence of any error in a plurality of responses to a plurality of commands from the devices installable in the device installation section, by associating the pieces of error determination information with a combination of the formats of the installable devices and the commands executable by the devices, the program comprising:

instructing the host controller to issue a desired command in the commands executable by the device installed in the device installation section to the installed device;

acquiring the error determination information associated with the combination of the format of the installed device and the desired command from the error determination information table;

acquiring response content information regarding a content of a response to the desired command from the installed device from the host controller; and determining the presence or absence of any error in the response based on the error determination information and the response content information.

2. The error determination program according to claim 1, wherein the error determination information specifies a single or a plurality of error-related portions in the response content information, and the information processor determines the presence or absence of any error in the response based on the single or the plurality of error-related portions specified by the error determination information.

3. The error determination program according to claim 1, wherein the device installation section installs the devices of a plurality of kinds, specifications, standards, and/or versions; the error determination information table stored in the storage circuit includes the pieces of error determination information for determining the presence or absence of any error in the responses to the commands from the devices installable in the device installation section, by associating the pieces of error determination information with a combination of the kinds, the specifications, the standards, and/or the versions of the installable devices and the commands executable by the installable devices; and the information processor acquires the error determination information associated with the combination of the kind, the specification, the standard, and/or the version of the device installed in the device installation section and the desired command from the error determination information table.

4. The error determination program according to claim 1, wherein at least one of the pieces of the error determination information included in the error determination information table stored in the storage circuit is associated with a plurality of combinations of the formats of the devices installable in the device installation section and the commands executable by the installable devices.

5. The error determination program according to claim 1, wherein the storage circuit further stores an error determination information specifying information table that includes a plurality of pieces of error determination information specifying information for specifying the pieces of error determination information in the error determination information table, by associating the pieces of error determination information specifying information with a combination of a plurality of pieces of format specifying information that specifies each of the formats of the devices installable in the device installation section and a plurality of pieces of command specifying information that specifies each of the commands executable by the installable devices; and the information processor acquires the error determination information specifying information associated with the combination of the format specifying information for specifying the format of the device installed in the device installation section and the command specifying information for specifying the desired command from the error determination information specifying information table to acquire the error determination information specified by the acquired error determination information specifying information from the error determination information table.

6. The error determination program according to claim 1, wherein when the presence of any error in the response is determined, the information processor further specifies the content of the error present in the response based on the error determination information and the response content information.

7. The error determination program according to claim 1, wherein the error determination information is a bit pattern, and the information processor performs a logical product calculation of the error determination information and the response content information to determine the presence or absence of any error in the response depending on whether a calculation result is equal to zero.

8. The error determination program according to claim 1, wherein the storage circuit stores a plurality of error determination information tables that correspond to each of the formats of the devices installable in the device installation section and that include each of the pieces of error determination information for determining the presence or absence of any error in the responses to the commands executable by the installable devices; and the information processor selects an error determination information table corresponding to the format of the device installed in the device installation section from the plurality of error determination information tables to acquire the error determination information for determining the presence or absence of any error in the response to the desired command from the selected error determination information table so as to determine the presence or absence of any error in the response based on the error determination information and the response content information.

9. The error determination program according to claim 1, wherein the storage circuit further stores an immediately-preceding command error determination information table that includes a plurality of pieces of immediately-preceding command error determination information for determining whether any error of a command issued immediately before a single command in the commands is present or not in a response to the single command upon issuing the commands to any one of the devices installable in the device installation section, by associating the pieces of immediately-preceding command error determination information with the formats of the devices installable in the device installation section; and the information processor acquires the immediately-preceding command error determination information associated with the format of the device installed in the device installation section from the immediately-preceding command error determination information table so as to determine the presence or absence of any error in the response to the desired command based on the error determination information associated with the combination of the format of the installed device and the desired command, the response content information, the immediately-preceding command error determination information, and the error determination information associated with the combination of the format of the installed device and the command issued immediately before the desired command.

10. The error determination program according to claim 9, wherein after determining the presence or absence of any error in the response to the command issued immediately before the desired command, the information processor generates or updates and stores immediately-preceding command check information for determining whether any error of the command immediately before the desired command is present or not in the response to the desired command based on the error determination information associated with the combination of the format of the device installed in the device installation section and the command immediately before the desired command and the immediately-preceding command error determination information associated with the format of the device installed in the device installation section to acquire the response content information regarding the content of the response to the desired command from the installed device from the host controller so as to determine the presence or absence of any error in the response to the desired command based on the error determination information associated with the combination of the format of the installed device and the desired command, the response content information, and the immediately-preceding command check information.

11. An error determination method executed by an information processor included in an electronic apparatus that includes a device installation section capable of installing any one of a plurality of devices having different formats, a host controller acting as an intermediary between the information processor and the device installed in the device installation section, and a storage circuit storing an error determination information table that includes a plurality of pieces of error determination information for determining a presence or absence of any error in a plurality of responses to the commands from the devices installable in the device installation section, by associating the pieces of error determination information with a combination of the formats of the installable devices and a plurality of commands executable by the installable devices, the method comprising:

instructing the host controller to issue a desired command in the commands executable by the device installed in the device installation section to the installed device;

acquiring the error determination information associated with the combination of the format of the installed device and the desired command from the error determination information table;

acquiring response content information regarding a content of a response to the desired command from the installed device from the host controller; and determining the presence or absence of any error in the response based on the error determination information and the response content information.

12. An electronic apparatus, comprising:

an information processor;

a device installation section capable of installing any one of a plurality of devices having different formats;

a host controller acting as an intermediary between the information processor and the device installed in the device installation section; and a storage circuit storing an error determination information table that includes a plurality of pieces of error determination information for determining the presence or absence of any error in a plurality of responses to a plurality of commands from the devices installable in the device installation section, by associating the pieces of error determination information with a combination of the formats of the installable devices and the commands executable by the installable devices, wherein the information processor instructs the host controller to issue a desired command in the commands executable by the device installed in the device installation section to the installed device, acquires the error determination information associated with the combination of the format of the installed device and the desired command from the error determination information table, acquires response content information regarding a content of a response to the desired command from the installed device from the host controller, and determines the presence or absence of any error in the response based on the error determination information and the response content information.

13. The electronic apparatus according to claim 12, wherein the store circuit further stores an error determination information specifying information table that includes a plurality of pieces of error determination information specifying information for specifying the pieces of error determination information in the error determination information table, by associating the pieces of error determination information specifying information with a combination of a plurality of pieces of format specifying information for specifying each of the formats of the devices installable in the device installation section and a plurality of pieces of command specifying information for specifying each of the commands executable by the installable devices; and the information processor acquires the error determination information specifying information associated with the combination of the format specifying information for specifying the format of the device installed in the device installation section and the command specifying information for specifying the desired command from the error determination information specifying information table so as to acquire the error determination information specified by the acquired error determination information specifying information from the error determination information table.

14. The electronic apparatus according to claim 12, further comprising a communication circuit to update and/or rewrite at least one of the error determination information table and the error determination information specifying information table via the communication circuit.

15. An error determination program stored on a non-transitory computer readable medium comprising:
  instructing a host controller to issue a desired command in commands executable by a device installed in a device installation section to an installed device;
  acquiring an error determination information associated with a combination of a format of the installed device and a desired command from an error determination information table;
  acquiring response content information regarding a content of a response to the desired command from the installed device from the host controller; and
  determining presence or absence of any error in a response based on the error determination information and the response content information.

* * * * *